United States Patent
Urai

(10) Patent No.: US 6,452,759 B2
(45) Date of Patent: *Sep. 17, 2002

(54) YOKE-TYPE MAGNETORESISTIVE (MR) HEAD, YOKE-TYPE MR COMPOSITE THIN FILM HEAD, AND MAGNETIC STORAGE APPARATUS

(75) Inventor: Haruo Urai, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,450

(22) Filed: Nov. 22, 1999

(30) Foreign Application Priority Data

Nov. 27, 1998 (JP) .............................. 10-336657

(51) Int. Cl.$^7$ ................................. G11B 5/33
(52) U.S. Cl. ..................................... 360/318
(58) Field of Search .................... 360/318, 318.1, 360/317, 321; 29/603.7, 603.13, 603.14, 603.23

(56) References Cited

U.S. PATENT DOCUMENTS

| | | | | |
|---|---|---|---|---|
| 4,734,644 A | * | 3/1988 | Imakoshi et al. | 324/252 |
| 5,164,869 A | * | 11/1992 | Fontana, Jr. et al. | 360/318 |
| 5,225,951 A | * | 7/1993 | Kira et al. | 360/321 |
| 5,255,141 A | * | 10/1993 | Valstyn et al. | 360/321 |
| 5,648,884 A | * | 7/1997 | Lazzari | 360/318.1 |
| 5,703,740 A | * | 12/1997 | Cohen et al. | 360/126 |
| 5,930,087 A | * | 7/1999 | Brug et al. | 360/132 |

FOREIGN PATENT DOCUMENTS

| | | | |
|---|---|---|---|
| JP | 63-205584 | | 8/1988 |
| JP | 3-66015 | | 3/1991 |
| JP | 9-251614 | * | 9/1997 |

* cited by examiner

Primary Examiner—Brian E. Miller
Assistant Examiner—Tianjie Chen
(74) Attorney, Agent, or Firm—Sughrue Mion, PLLC

(57) ABSTRACT

The present invention provides a yoke type magnetoresistive (MR) composite thin film head having no other gap than the recording/reproducing gap so as to increase the recording characteristics and reproduction characteristics. A magnetic gap 70 is formed between a front portion of an upper pole 6 and a front portion of a lower pole 1, whereas a rear portion of the upper pole 6 and a rear portion of the lower pole 1 are magnetically connected to form a magnetic flux path. A mesa pattern 2 is provided apart from the magnetic gap 70 and a magnetoresistive element (MR pattern) 3 is arranged on a front slope 2a of the mesa pattern 2. The upper pole 6 and the lower pole 1 are magnetically bridged via the MR element 3, so as to form a separate magnetic flux flow path via the MR element 3. This separate magnetic flux flow path is used for reproduction of a magnetic recording information. A write-in coil is arranged on the mesa pattern 2. The upper pole 6 and the lower pole 1 have no gap in the midst of the poles, increasing the ratio of generation of the recording magnetic field. A lead pattern 3a is derived from the front slope 2a and via a side slope 2b.

17 Claims, 18 Drawing Sheets

YOKE-TYPE MAGNETORESISTIVE (MR) HEAD, YOKE-TYPE MR COMPOSITE THIN FILM HEAD, AND MAGNETIC STORAGE APPARATUS

BACKGROUND OF THE INVENTION

1. Field of the Invention

The present invention relates to a yoke-type magnetoresistive (MR) head, a yoke-type MR composite film head, and a magnetic storage apparatus using the same.

2. Description of the Related Art

Recently, with the rapid development of the computer processing capability, a magnetic recording medium such a hard disk is desired to increase the data transfer rate. In order to realize this, a magnetoresistive type magnetic head has been playing a significant role.

Originally, the magnetic head using the magnetoresistive (MR) head was dedicated for production (information reading). However, the magnetic storage apparatus requires a head capable of not only reproduction but also recording (write in). For this, a shield type MR head and a yoke type MR head have been developed and examined.

In the shield type MR head as shown in FIG. 6 of Japanese Patent publication A63-205584, an MR pattern (magnetoresistive element) is sandwiched by a soft magnetic shield, and adjacent to the shield, an electromagnetic induction type recording head is arranged.

FIG. 17 is a cross sectional view showing a configuration of the conventional shield type MR head. In the conventional shield type MR head 101 an MR pattern (magnetoresistive element) 105 is arranged via an MR insulation layer 104 made from a non-magnetic material such as oxide and sandwiched by a lower shield layer 102 made from a soft magnetic material and a common pole 103 made from a soft magnetic material. The conventional shield type MR head 101 further includes an electromagnetic induction type recording head constituted by the common pole 103, an upper pole 106, and a coil pattern 107. One end of the MR pattern 105 is exposed to a head air bearing surface (ABS). The common pole 103 and the upper pole 106 are magnetically connected at their rear ends (opposite to the head ABS side). It should be noted that the reference symbol 108 denotes a non-magnetic layer made from an oxide or the like. This non-magnetic layer 108 constitutes a recording gap serving for electrical insulation between the coil pattern 107 and the common pole 103. The reference symbol 109 is a layer for covering a stepped portion. This stepped portion coverage layer coves a stepped portion formed by the coil pattern 107 and serves for electric insulation between the coil pattern 107 and the upper pole 106.

The yoke type MR head provides a hollow space at a portion of the yoke constituting the magnetic head and an MR pattern (magnetoresistive element) is arranged in the vicinity of this hollow space.

FIG. 18 is a cross sectional view showing a configuration of a conventional yoke-type MR head. The conventional yoke type MR head 201 includes a lower pole 202, an upper pole front part 203, an upper pole rear part 204, an MR pattern (magnetoresistive element) 205, and a coil pattern 206. The reference symbol 207 denotes a non-magnetic layer made from an oxide or the like. This non-magnetic layer 207 forms a gap between the lower pole 202 and the upper pole front part 203. The upper pole rear part 204 and the lower pole 202 are magnetically connected at the rear side (opposite to the head air bearing surface). The reference symbol 208 denotes a gap provided between the upper pole front part 203 and the upper pole rear part 204. The MR pattern 205 is arranged in the vicinity of this gap 208. The lower pole 202 and the upper pole rear part 204 are magnetically connected at the rear part (opposite to the head air bearing surface). Symbol 209 denotes a stepped portion coverage layer made from a non-magnetic material.

As shown in FIG. 18, in the conventional yoke type MR head 201, a gap 208 is present in a portion of the yoke pattern constituted by the lower pole 202, the upper pole front part 203, and the upper pole rear part 204. Accordingly, there is a defect that a magnetic flux cannot effectively pass through during recording. To eliminate this defect, Japanese Patent Publication A3-66015 suggests a composite type thin film magnetic head which includes a center pole (not depicted) in the vicinity of the gap 208, so as to increase the recording efficiency.

In the conventional shield type MR head as shown in FIG. 17, the MR pattern is partially exposed to the ABS plane (head air bearing surface) where the magnetic head faces a recording medium. Accordingly, when the recording medium is brought into contact with the MR pattern, the MR pattern generates a noise. This noise generation phenomenon is called thermal asperity. In a recent magnetic storage apparatus, in order to increase the recording density, the head flying height is minimized for the recording medium. When the head flying height is decreased, the medium is brought into contact with the head more frequently, often causing thermal asperity of the reproduction output. That is, in a higher density recording, thermal asperity noise tends to increase. For this, the magnetic storage apparatus using the conventional shield type MR head may lower reliability.

The cause of the thermal asperity in a reproduction signal of the conventional shield type MR head can be explained as follows. During a magnetic recording, the MR head and the medium relatively move at a high speed equal to above 10 m per second. Here, if the magnetic head flowing amount is small and is brought into contact with the MR pattern of the head, the collision generates a friction head so that the MR pattern temperature is instantaneously increased. When the MR pattern temperature is increased, its component, i.e., ferromagnetic metal thin film increase resistance. In a detection circuit reading an information item by converting into voltage the resistance change in the MR pattern signal magnetic field, the resistance change by heat generation is erroneously read as a signal. Moreover, the heated MR pattern has a great cooling time constant compared to an ordinary signal waveform. Until the MR pattern is cooled down, a great DC-like bias voltage is applied to the signal, which greatly shifts the detection level. This may cause a signal burst error.

Furthermore, another thermal asperity is involved. In the MR head a sense current is constantly applied to the MR pattern. For this, the MR pattern constantly generates some heat. When the medium is brought into contact with the MR pattern and the collision energy is not so large, the heat of the MR head moves to the medium, the MR pattern temperature is instantaneously lowered. This temperature lowering reduces the resistance of the MR pattern, which may cause a signal magnetic field detection error. In either case, the conventional shield type MR head has a configuration which easily cases the thermal asperity as a first problem.

The second problem of the shield type MR head is that the magnetic recording element and the reproduction element are not aligned at the same position on the ABS plane.

Accordingly, the recording track position and the reproduction track position are slightly different. Consequently, the magnetic disk apparatus should have a servo circuit to correct the difference.

These first and second problems can be improved by the yoke type MR head shown in FIG. 18. In the yoke type MR head, in order to solve the problems of thermal asperity, the MR pattern is located at a position far from the ABS plane. This configuration allows to use the yoke as a recording head having a gap, and generation of the recording magnetic field is significantly low. On the other hand, with increase of the magnetic recording density, the coercive force Hc of the recording medium tends to be increased. This leads to a high magnetic field intensity from the magnetic head required for recording. However, the conventional yoke type MR head cannot generate a sufficiently high magnetic field intensity and is not preferable for a high density recording. This is a third problem.

The third problem is caused as follows. As shown in FIG. 18, in the yoke type MR head, the MR pattern 205 is provided at the gap 208 between the upper pole front part 203 and the upper pole rear part 204. The upper pole front part and the rear part serve as a yoke for the MR pattern. This yoke has a large heat capacity. Even if the tip end of the recording pole (ABS plane) collide against the recording medium, the heat generation is not transferred to the MR pattern. Accordingly, no thermal asperity is generated. However, since the yoke has the gap 208, and the magnetic resistance of the yoke is increased. For this, it is impossible to increase a magnetic flux for recording. Accordingly, it is also impossible to increase the gap generated magnetic field generated on the ABS plane. That is, the conventional yoke type MR head has a demerit that the recording capability is low.

Furthermore, the conventional yoke type MR head has a problem in the reproduction efficiency. It is usual that the upper and the lower yokes have reluctance almost identical to the reluctance of the MR pattern. Accordingly, as shown in FIG. 18, when the MR pattern and the upper and lower poles as a yoke are connected in series, the total reluctance is doubled compared to the upper and lower poles alone. When the reluctance is doubled, this decreases by half the signal magnetic flux flowing from the information pattern of the magnetic recording medium into the upper and lower pole. That is, the efficiency is lowered during reproduction, too.

SUMMARY OF THE INVENTION

It is therefore an object of the present invention to provide a yoke type magnetoresistive (MR) head and yoke type magnetoresistive composite thin film head having an improved recording characteristic and reproduction characteristic by eliminating gaps other than the gap for recording and reproduction, as well as a magnetic storage apparatus using the yoke type magnetoresistive composite thin film head.

The yoke type magnetoresistive head according to the present invention comprises an upper pole, a lower pole, and a magnetoresistive (MR) element, wherein a magnetic gap is formed between a front end of the upper pole and a front end of the lower pole, and a rear end of the upper pole and a rear end of the lower pole is magnetically connected to form a magnetic flux path; and the magnetoresistive element is arranged at a deeper position than the magnetic gap so that the upper pole and the lower pole are magnetically bridged via the magnetoresistive element.

In this yoke type MR head, the upper pole and the lower pole are magnetically bridged via the MR element, thus forming separate magnetic flow path, which enables reproduction of a magnetic recording information. Since both of the upper pole and the lower pole have no gap, when the yoke type MR head is used for recording, it is possible to increase the recording magnetic flux amount, thus increasing the recording capability.

According to another aspect of the present invention, there is provided a yoke type magnetoresistive (MR) head comprising an upper pole, a lower pole, a magnetoresistive element, and write-in coil, wherein a magnetic gap is formed between a front end of the upper pole and a front end of the lower pole, and a rear end of the upper pole and a rear end of the lower pole is magnetically connected to form a magnetic flux path; the magnetoresistive element is arranged at a deeper position than the magnetic gap so that the upper pole and the lower pole are magnetically bridged via the magnetoresistive element so as to form a separate magnetic flux path; and the write-in coil is arranged between the upper pole and the lower pole.

In this yoke type MR head, the upper pole and the lower pole are magnetically bridged, so as to form a separate magnetic flux flow path via the MR element. This separate magnetic flux flow path can be used for reproducing a magnetic recording information. Since both of the upper pole and the lower pole have no gap, when using the yoke type MR head for recording, it is possible to increase the magnetic flux amount for recording, thus increasing the recording capability.

According to still another aspect of the present invention, there is provided a yoke type magnetoresistive (MR) composite thin film head comprising a lower pole, a recording gap insulation layer, a coil pattern, and an upper pole, wherein between the lower pole and the upper pole, there is arranged a mesa pattern formed from an insulation material and having slopes, one of the slopes being arranged at a deeper position than a throat height of the recording gap, and this slope having a magnetoresistive sensing element; and the upper pole and the lower pole have no magnetic gap.

In this yoke type MR composite thin film head, the upper pole and the lower pole are bridged via the MR element, so as to form a separate magnetic flux flow path, which can be used for reproduction of a magnetic recording information. Since both of the upper pole and the lower pole have no gap in the midst of the poles, it is possible to increase the magnetic flux amount for recording, thus increasing the recording capability.

The MR sensing element provided on one of the slopes of the mesa pattern in contact with a lead pattern extending to another slope adjacent to the aforementioned slope, and connected to an electrode via the slope.

This configuration allows the lead pattern assured to be connected to outside circuits.

The coil pattern may be formed on the mesa pattern. By forming the coil pattern on the mesa pattern, it is possible to reduce the dimension in the front and rear direction of the yoke type MR composite thin film head.

Moreover, the coil pattern may be formed adjacent to the mesa pattern.

By arranging the coil pattern not on the mesa pattern, it is possible to reduce the dimension in the height direction of the yoke type MR composite thin film head. Furthermore, by forming the coil pattern 4 and the mesa pattern almost on the same plate, it is possible to minimize the stepped portion. This enables to reduce the plating frame forming photoersist thickness of the upper pole. This is advantageous for narrowing the tip end of the upper pole.

At least in one of the upper pole and the lower pole, a portion of the film farther from the magnetic gap than the mesa pattern slope having the MR sensing element may have a reduced thickness than the other portion.

By reducing the film thickness of the upper pole or the lower pole, it is possible to increase the reluctance of the upper pole and the lower pole in series. When the series reluctance is increased, the magnetic flux amount flowing in the MR pattern is increased. This increases the reproduction output of the MR pattern.

At least in one of the upper pole and the lower pole, a portion of the film farther from the magnetic gap than the mesa pattern slope having the MR sensing element may have a reduced magnetic permeability than the other portion.

By reducing magnetic permeability, it is possible to increase the reluctance of the upper and lower poles in series. As a result, the magnetic flux amount flowing into the MR pattern is increased, thus increasing the reproduction output of the MR pattern.

Furthermore, at least in one of the upper pole and the lower pole, a portion of the film farther from the magnetic gap than the mesa pattern slope having the MR sensing element may have a reduced magnetic permeability and an increased saturation magnetic flux density than the other portion.

By reducing the permeability in the upper and/or lower poles, the reproduction output of the MR pattern is increased. And by increasing the saturation magnetic flux density, it is possible to assure a recording capability.

The lower pole may have an indentation to define the throat height and a mesa pattern can be arranged in the indentation.

With this configuration, the MR pattern can be arranged in the vicinity of the throat height, which increases the ratio of the signal flux flowing into the MR pattern. Moreover, it is possible to reduce the dimension of the yoke type MR composite thin film head in the height direction, facilitating to reduce the track width.

Moreover, the lower pole may have an indentation to define the throat height and a mesa pattern is arranged in the indentation, after which the MR sensing element is arranged on a slope of the mesa pattern; the indentation is filled with a non-magnetic insulator and flattened; a gap insulation layer is formed; a front portion of the upper pole is formed; and then the coil pattern and the upper pole are formed.

With the aforementioned configuration, it becomes easy to form a plating frame of a narrow track width.

According to still another aspect of the present invention, there is provided a magnetic storage apparatus comprising a yoke type MR composite thin film head having a lower pole and an upper pole sandwiching a mesa pattern formed from an insulation material and having slopes, wherein one of the slopes is located at a deeper position than a throat height of a recording gap; an MR sensing element is provided on that slope; and the upper pole and the lower pole have no magnetic gap, the yoke type MR composite thin film head being mounted on a slider substrate, which is maintained above a disk-shaped magnetic recording medium and the disk-shaped magnetic recording medium is rotated for magnetic recording and reproduction.

By using the yoke type MR composite thin film head, it is possible to realize a magnetic storage apparatus without causing thermal asperity.

According to yet another aspect of the present invention, there is provided a magnetic storage apparatus comprising a yoke type MR composite thin film head having a lower pole and an upper pole sandwiching a mesa pattern formed from an insulation material and having slopes, wherein one of the slopes is located at a deeper position than a throat height of a recording gap; an MR sensing element is provided on that slope; and the upper pole and the lower pole have no magnetic gap, the yoke type MR composite thin film head being mounted on a head assembly, the head assembly is brought into contact with a traveling magnetic tape for magnetic recording and reproduction.

By using this yoke type MR composite thin film head, it is possible to realize a magnetic storage apparatus without causing thermal asperity.

DESCRIPTION OF THE PREFERRED EMBODIMENT

Description will now be directed to preferred embodiments of the present invention with reference to the attached drawings.

Figure 1:
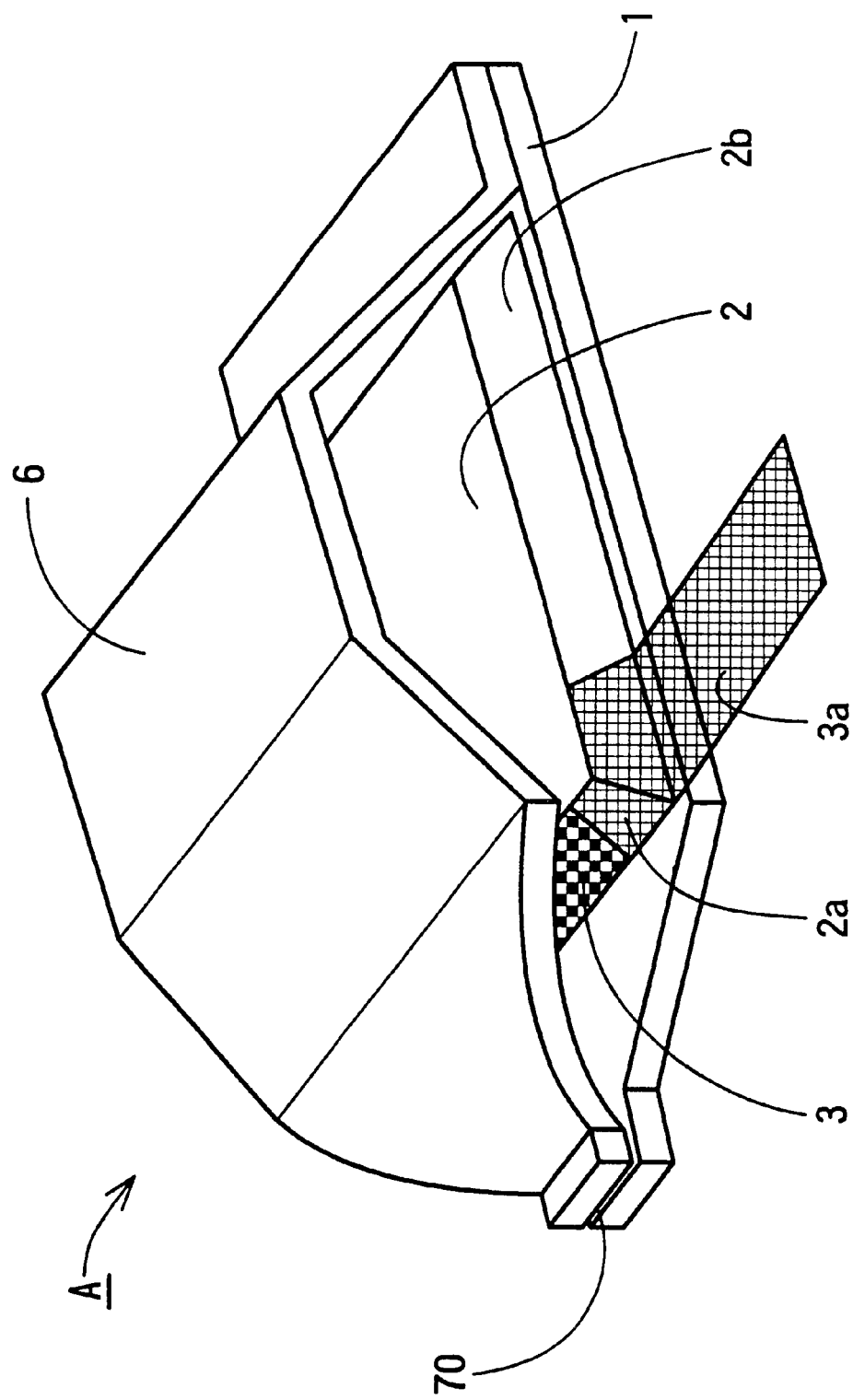
FIG. 1 is a perspective view of a yoke type magnetoresistive (MR) composite thin film head according to a first embodiment of the present invention.
Figure 2:
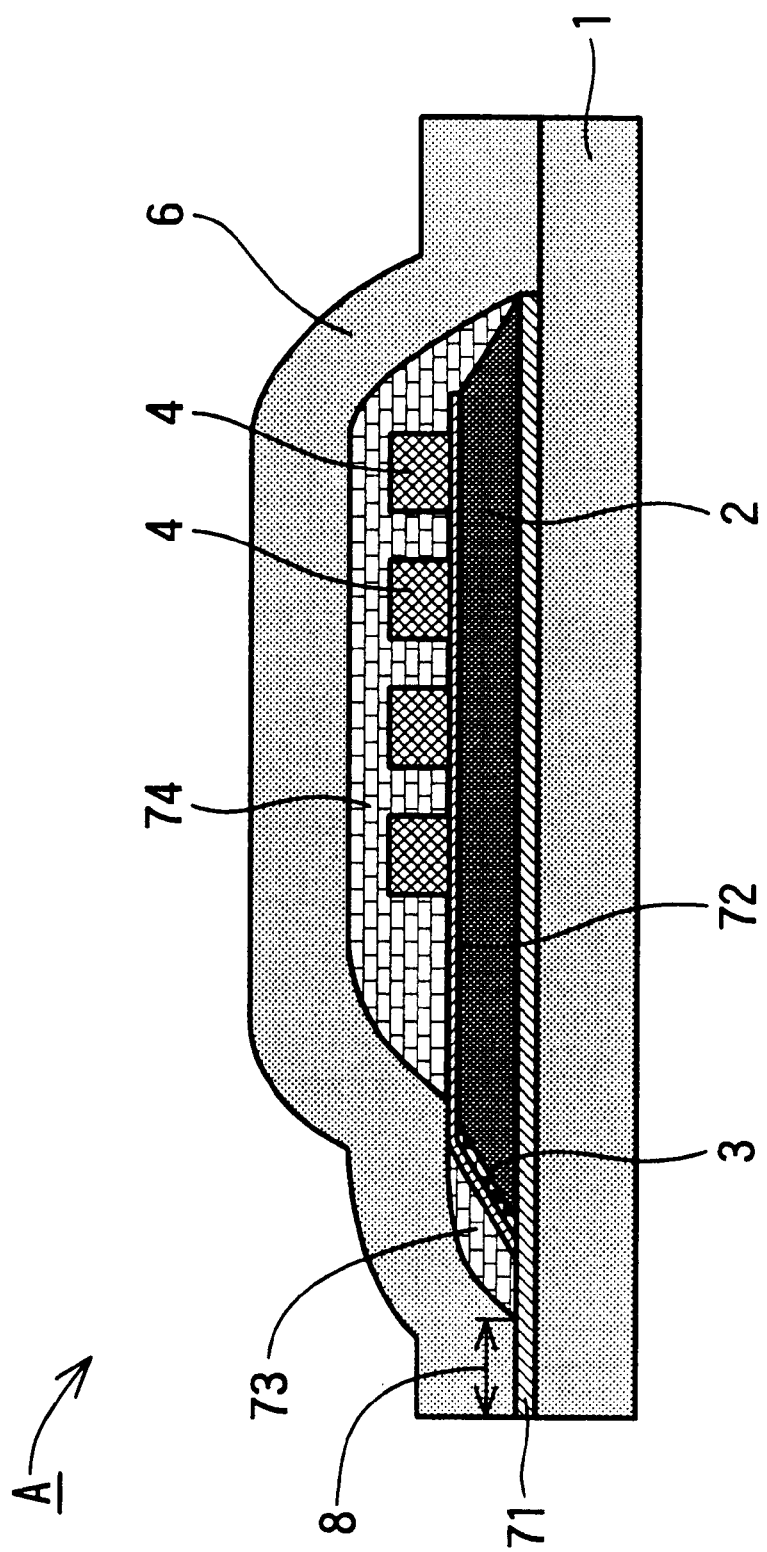
FIG. 2 is a cross sectional view of the yoke type magnetoresistive composite thin film head according to the first embodiment of the present invention.
Figure 3:
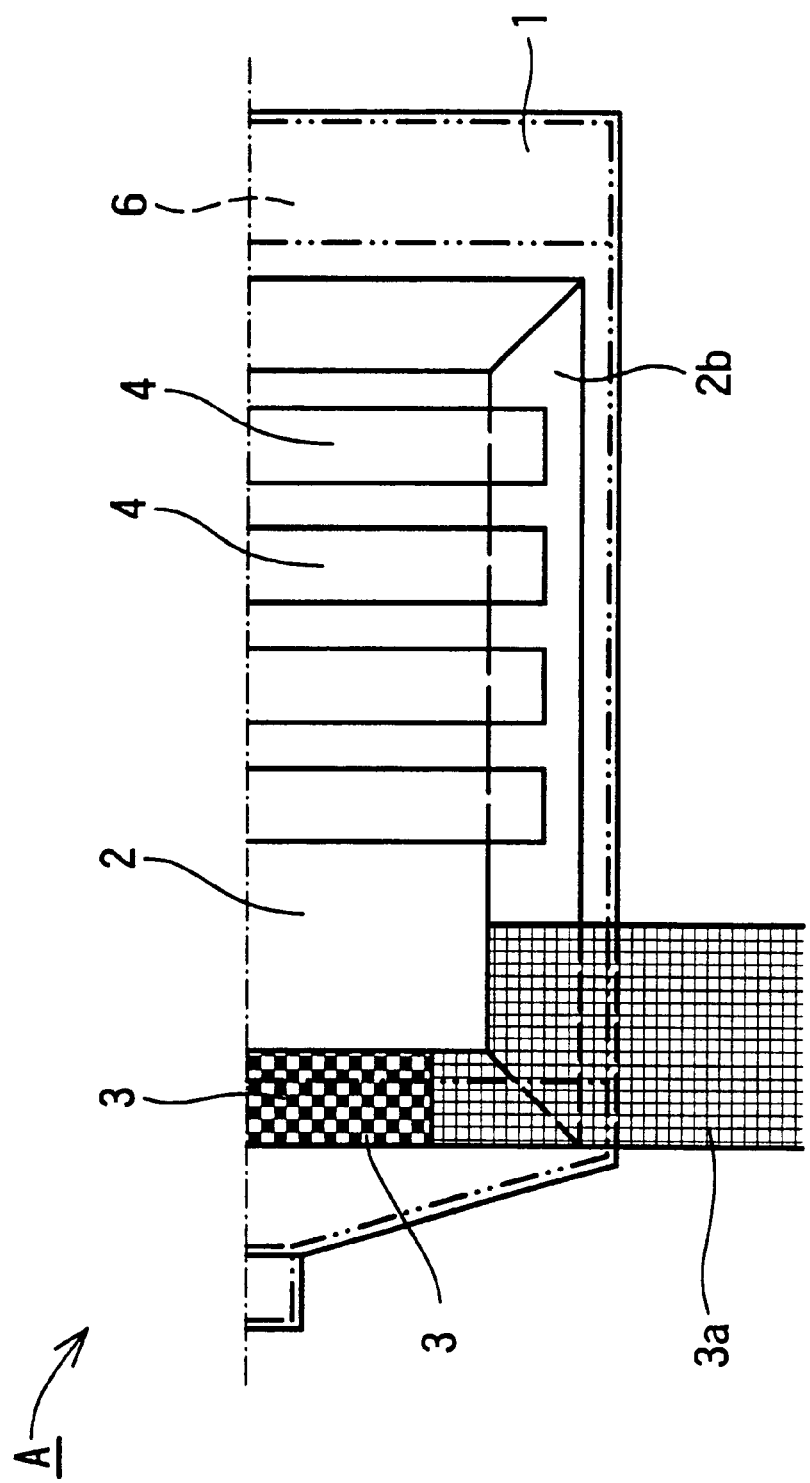
FIG. 3 is a plan view of the yoke type magnetoresistive composite thin film head according to the first embodiment of the present invention.

FIG. 1 is a perspective view of a yoke type magnetoresistive (MR) composite thin film head according to a first embodiment of the present invention; FIG. 2 is a cross sectional view of the yoke type magnetoresistive composite thin film head according to the first embodiment of the present invention; and FIG. 3 is a plan view of the yoke type magnetoresistive composite thin film head according to the first embodiment of the present invention. It should be noted in the plan view of FIG. 3, an upper half and a lower half are symmetric, and only the lower half is shown.

As shown in FIG. 1, in the yoke type magnetoresistive (MR) composite thin film head A, a mesa pattern 2 is formed from an insulation material between a lower pole 1 and an upper pole 6, and an MR pattern 3 is arranged on a slope 2a in front of the mesa pattern 2. This MR pattern 3 has an end portion connected to an electrode (not depicted) by an MR lead pattern 3a extending from the front slope 2a to an adjacent slope 2b.

The lower pole 1 and the upper pole 6 are magnetically connected at their rear ends, whereas at their front ends, a recording gap 70 is formed for recording and reproduction. It should be noted that FIG. 1 shows only a basic configuration, omitting a gap insulation layer 71 and a coil pattern 4 formed on the mesa pattern 2. Furthermore, the MR pattern and the MR lead pattern 3a are hatched so as to clarify their regions, and not their cross sectional view.

As shown in FIG. 2, a gap insulation layer 71 is formed on the lower pole 1 and a mesa pattern 2 is formed on this gap insulation layer 71. The mesa pattern is provided deeper than a throat height 8 of the recording gap. The MR pattern 3 is formed on the front slope of the mesa pattern 2. The mesa pattern is covered with an MR insulation layer 72, and on this MR insulation layer 72, there is provided a coil pattern. Next, a first step coverage layer 73 and a second step coverage layer 74 are formed, and an upper pole 6 is formed thereon.

The interval between the upper end of the MR pattern 3 and the upper pole 6 and the interval between the lower end of the MR pattern 3 and the lower pole 1 are sufficiently small in comparison to the height of the MR pattern 3 (in the direction vertical to the sensor current flow direction).

As shown in FIG. 3, the coil pattern 4 protrudes to the slope 2b of the side of the mesa pattern 2. Thus, the coil pattern 4 can be drawn out from the slope 2b of the mesa pattern 2. It should be noted that in FIG. 3, in order to show the inner configuration, the upper pole 6 is removed. For this, the configuration of the upper pole 6 is indicated by a virtual line (alternate long and two short dashes line). The virtual line is slightly shifted from the actual position so as to show the entire configuration. Moreover, the gap insulation layer 71 and the step coverage layers 73 and 74 are omitted. Furthermore, the MR pattern 3 and the MR lead pattern 3a are hatched to clarify their regions.

Figure 4:
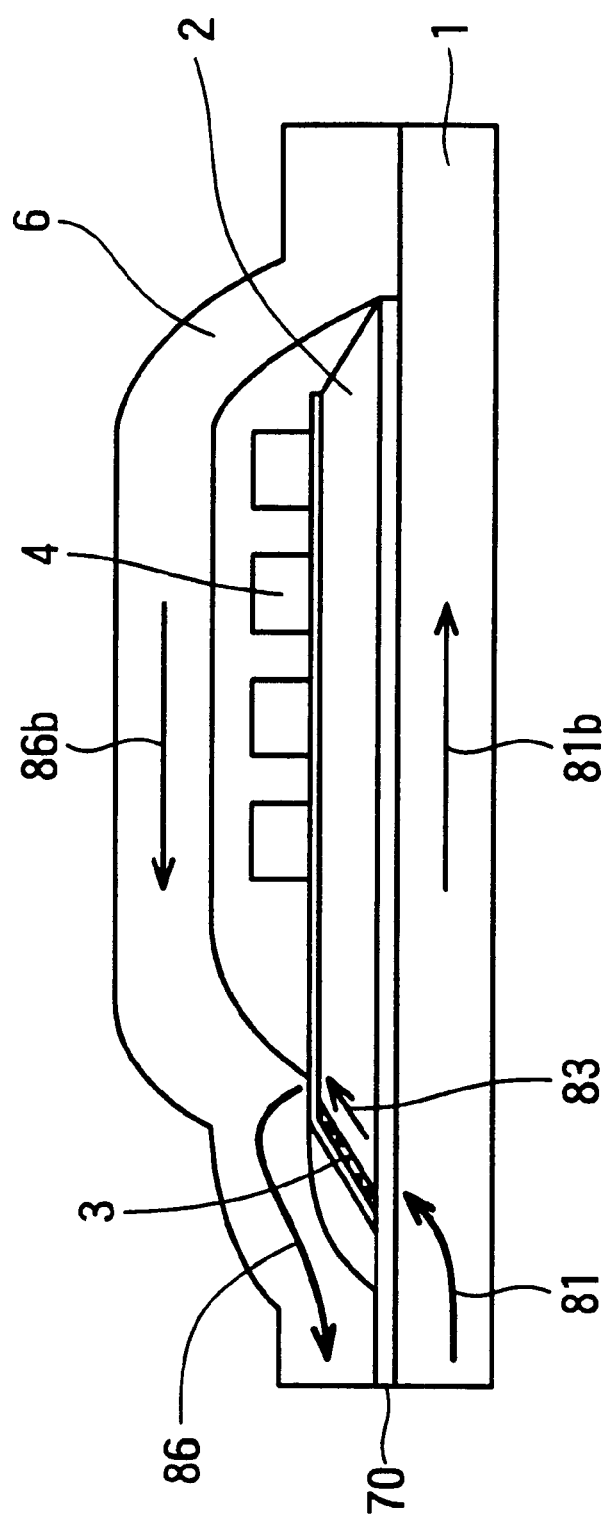
FIG. 4 shows the operation principle of the yoke type magnetoresistive composite thin film head according to the present invention.

FIG. 4 explains operation principle of the yoke type magnetoresistive composite thin film head according to the present invention. The yoke type magnetoresistive composite thin film head A according to the present invention is characterized in that an MR pattern (magnetoresistive element) 3 as a magneto-sensing element is provided between the upper pole 6 and the lower pole 1, so that the upper pole 6 and the lower pole 1 are magnetically bridged via this MR pattern 3.

For this, a part of signal magnetic flux 81 flowing from the tip end of the lower pole becomes a signal magnetic flux 83 passing through the MR pattern 3 and the other part becomes a parallel signal magnetic flux 81b and a parallel signal magnetic flux 86b passing through the upper pole. The signal magnetic flux 83 which has passed through the MR pattern joins the parallel signal fluxes 81b and 86b which have passed through the upper and the lower poles and flows out as a signal magnetic flux 86.

Here, the MR pattern is a NiFe alloy film having a pattern height of 2.5 micrometers and film thickness of 0.03 micrometers. The upper pole 6 and the lower pole 1 are made from a NiFe alloy having a thickness of 3 micrometers. The total length of the upper and the lower poles is 250 micrometers. In this case the MR pattern 3 and the upper and lower poles 1 and 6 have almost identical reluctance, and the parallel signal magnetic flux 81b and 86b passing through the upper and lower poles are almost identical to the signal magnetic flux 83 passing through the MR pattern 3. Since the MR head has a high sensitivity, it is possible to sufficiently detect a signal.

The reluctance of the upper and lower poles 1 and 6 can be increased by reducing the film thickness or by reducing magnetic permeability of the magnetic material. When the upper and lower poles 6 and 1 have an increased reluctance, the signal magnetic flux amount flowing into the MR pattern 3 is increased, further increasing the magnetic field detection sensitivity.

As is clear from FIG. 2, the upper and lower poles 6 and 1 have identical configurations as the conventional thin film type magnetic head, i.e., no magnetic gap is present. Accordingly, when a signal current is applied to the coil pattern 4 for magnetic recording, there is no magnetic flux leak in any position of the upper and lower poles 6 and 1. That is, there is no lowering of the head recording magnetic field generation due to insertion of the MR pattern 3 in to the magnetic head.

On the other hand, as is clear from FIG. 2, the MR pattern 3 according to the present embodiment is located at an indented position from the recording pole tip. Accordingly, even if the recording pole tip is brought into contact with the magnetic recording medium at a high speed, the pole itself serves as a heat shield and no temperature change arises in the MR pattern 3 and no thermal asperity noise is generated in the MR pattern 3. Thus, the characteristic of the yoke type MR head will not be deteriorated.

Next, explanation will be given on the production method of this yoke type MR composite thin film head with reference to FIG. 5 and FIG. 6. FIGS. 5(a) to 5(d) and FIGS. 6(e) and 6(f) show the production method of the yoke type MR composite thin film head according to the present invention.

Firstly, as shown in FIG. 5(a), the lower pole 1 is formed by NiFe alloy plating by frame plating method with thickness of 3 micrometers on a non-magnetic substrate (not depicted). Next, this lower pole 1 is buried in an alumina sputtered layer and subjected to flattening lapping. Next, as a recording gap insulation layer 71, an alulmina film (with thickness of 0.05 micrometers) is formed by sputtering. Next, as shown in FIG. 5(b), an alumina film of 1.8 micrometers is formed by sputtering, photo-resist is applied, exposed, developed, and 45-degree beam incident ion milling method is used to form the mesa pattern 2. The mesa pattern is surrounded by a 45-degree slope formed by the slanting beam incident ion milling. On this slope, for forming the MR pattern, three-layered MR film 30 of CoZrMo/Ta/NiFe is formed by sputtering with a total thickness of 0.07 micrometers. The NiFe film constituting the magneto-sensing element has a thickness of 0.03 micrometers.

Figure 5:
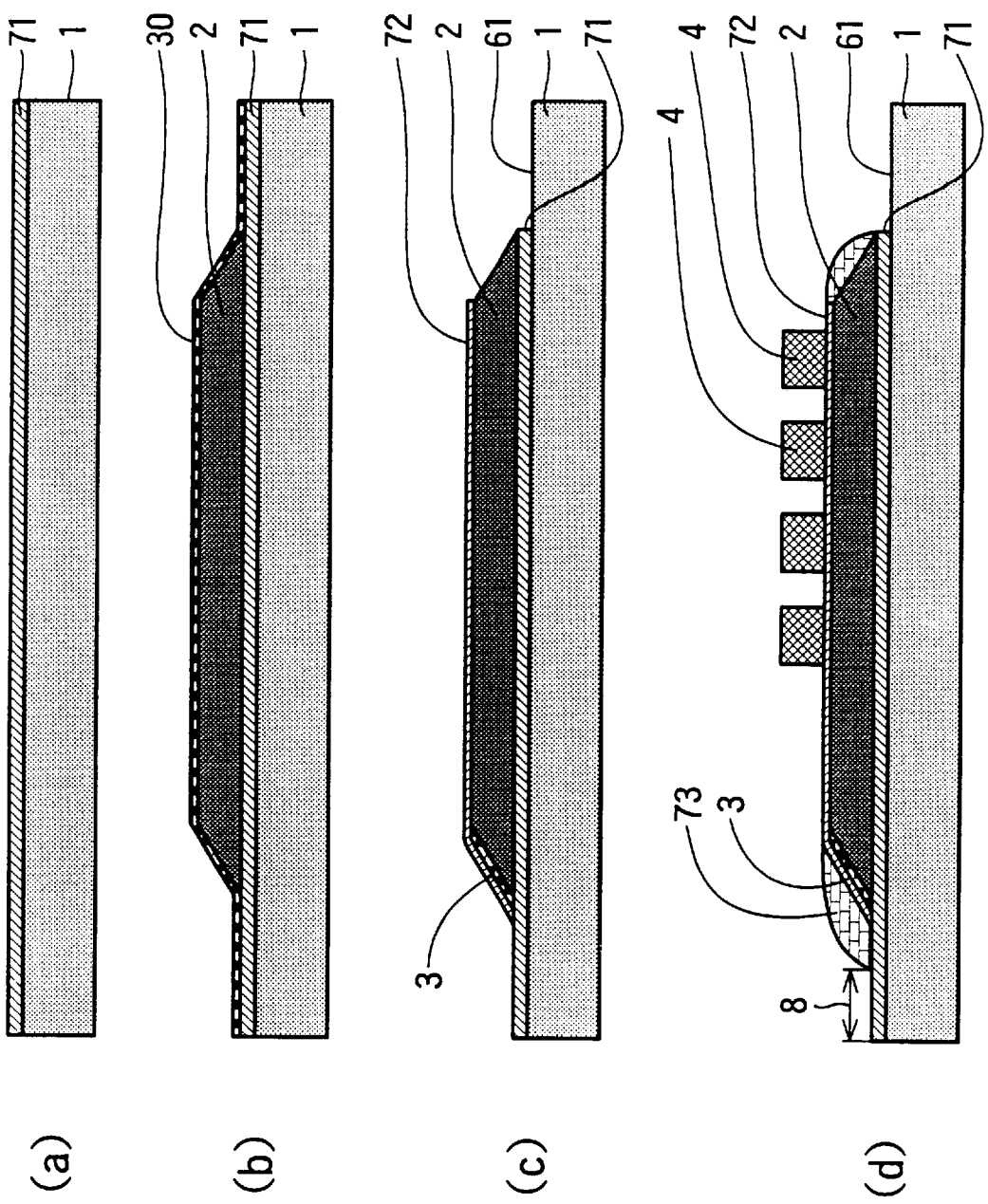
FIGS. 5A to 5D show a production method of the yoke type magnetoresistive composite thin film head according to the present invention.
Figure 6:
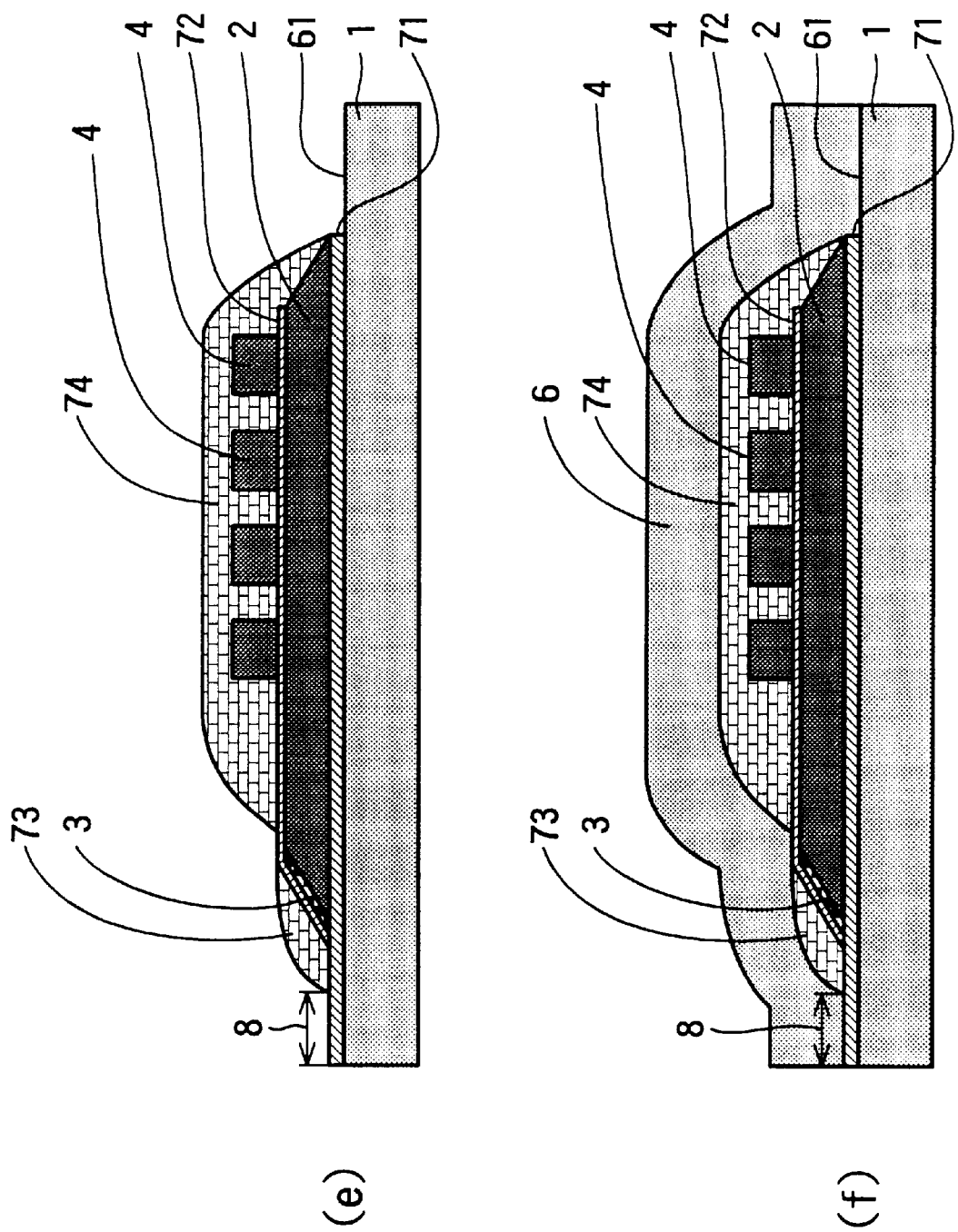
FIGS. 6E and 6F show a production method of the yoke type magnetoresistive composite thin film head according to the present invention.

Next, as shown in FIG. 5(c), photo-resist application, exposure, and ion milling are performed so that the MR pattern 3 is left on the slope of the recording gap side of the mesa pattern 2 and on the slanting portions at both sides of the recording gap. The MR pattern 3 thus formed has a height of about 2.5 micrometers because of the slope has 45-degree inclination. The MR pattern left at the both sides is covered with an electrode constituting Ta/Au film by sputtering and is subjected to photo-lithography so as to form the MR lead pattern 3a shown in FIG. 1 (not depicted in the cross sectional view of FIG. 5). After this, as the MR insulation layer 72, an alumina film of 0.1 micrometer thickness is formed, and the gap insulation layer 71 and the alumina at the rear end are removed to form the upper and lower pole connection portion 61.

Next, as shown in FIG. 5(d), the first step coverage layer 73 is formed from an organic resin (such as a photo-resist heat hardening pattern) is formed to determine the throat height 8 which greatly affect the recording/reproduction head efficiency. On the mesa pattern 2, an excitation coil pattern 4 is formed by the photo-resist application, exposure, development, and Cu plating.

Next, as shown in FIG. 6(e), the second step coverage layer 74 is formed from the aforementioned organic resin for filling the stepped portion of the coil pattern 4 and for electric insulation. Here, the recording gap side end of the mesa pattern (the upper portion of the MR pattern 3) is left uncovered by the organic resin.

Finally, as shown in FIG. 6(f), the upper pole 6 is formed by the photo-resist application, exposure, development, and NiFe plating. Here the NiFe film is formed to have a thickness of 3 micrometers. Thus, the yoke type MR composite thin film head A is complete.

Next, explanation will be given on the operation of the yoke type MR composite thin film head A according to the present invention. It is assumed that the MR pattern 3 has a width w, height h, thickness t, material saturation magnetic flux density Bs, and a material permeability $\mu$. On the other hand, each of the upper and lower poles has a width wp, height hp, thickness tp, material saturation magnetic flux density Bsp, and material permeability $\mu p$. The reluctance R of the MR pattern 3 can be expressed by Equation 1.

$R \sim \text{(nearly equal to)} \, h/(\mu \cdot w \cdot t)$  Equation 1

The reluctance Rp when the upper and lower poles 6 and 1 are connected in series can be expressed by Equation 2.

$Rp \sim \text{(nearly equal to)} \, 2 \cdot hp/(\mu p \cdot wp \cdot tp)$  Equation 2

Here, in the present embodiment, $\mu = \mu p$, w=wp, and t=0.03 micrometers=0.01 tp, h=2.5 micrometers=0.01×2· hp. If these relations are introduced in to the Equations 1 and 2, it is possible to obtain R=Rp. This means that unless the respective patterns are saturated, the signal magnetic flux amount passing through the MR pattern 3 is equal to the parallel signal magnetic flux amount passing through the upper and lower poles 6 and 1. That is, the MR pattern 3 can sufficiently detects the signal magnetic flux.

Figure 18:
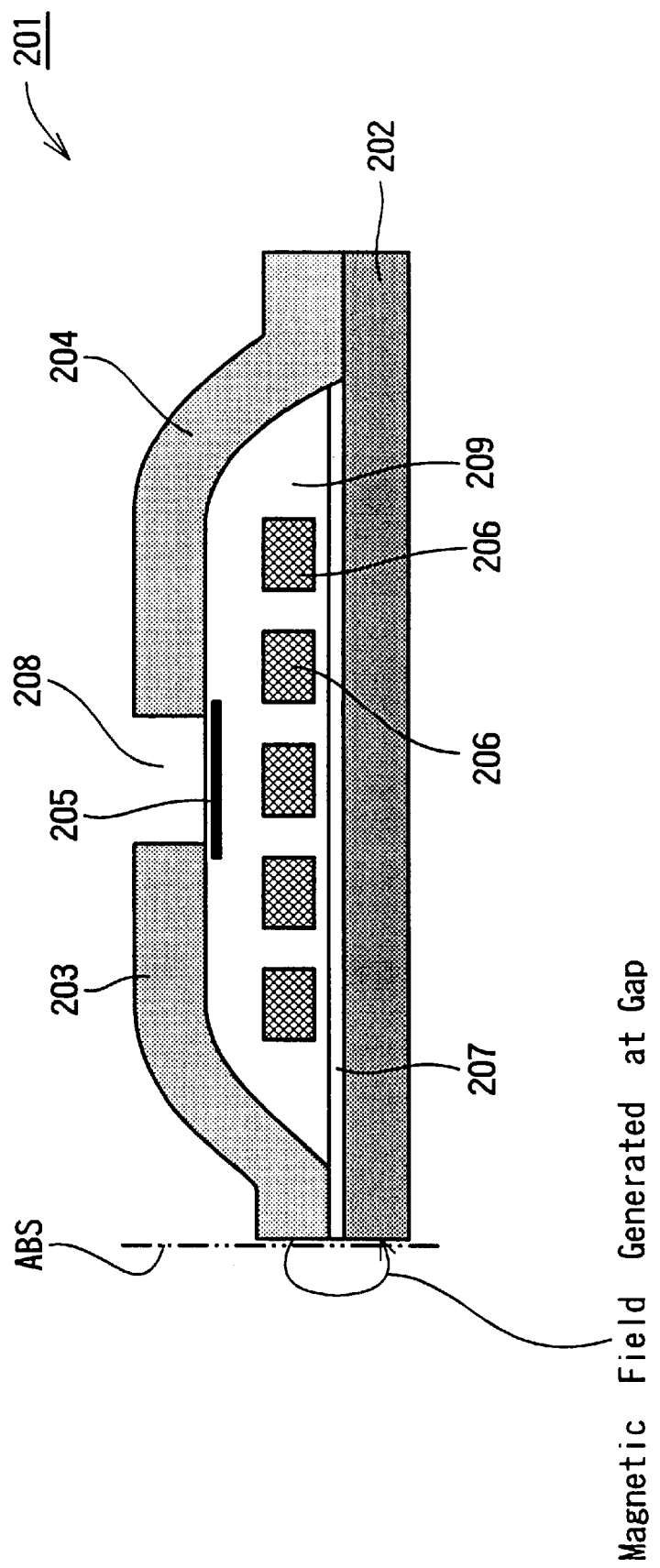
FIG. 18 is a cross sectional view of conventional yoke type MR head configuration.

In the conventional yoke type MR head shown in FIG. 18, the total series reluctance Rts of the upper and lower poles 202 through 204 and the MR pattern 205 is nearly R+Rp= 2R. In the present embodiment, since the MR pattern 3 and the upper and lower poles 6 and 1 are connected in parallel, the total parallel reluctance Rtp is nearly (½)R. Accordingly, from a brief calculation, the signal magnetic flux amount passing from a recording medium through the MR pattern 3 is doubled in comparison to the conventional example. That is, the yoke type MR head according to the present invention is improved by twice compared to the conventional example.

On the other hand, during recording, the upper and lower poles are saturated. The saturation magnetic flux amount $\Phi p$ of the upper and lower poles can be expressed by Equation 3 as follows.

$\Phi p = Bsp \cdot wp \cdot tp$  Equation 3

The saturation magnetic flux amount $\Phi$ of the MR pattern 3 can be expressed by Equation 4.

$\Phi = Bs \cdot w \cdot t$  Equation 4

Considering that the saturation magnetic flux density Bs and Bsp of these are almost identical and the both have an identical pattern width, from Equations 3 and 4, it is possible to obtain $\Phi p = 100 \Phi$. This means that when a coil current is applied during recording to magnetically saturate the upper and lower poles, the magnetic flux bridged by the MR pattern 3 is about $\frac{1}{100}$ of the total magnetic flux amount, which can be negligible small. That is, it is clear that the arrangement of the MR pattern of the present invention does not affect the recording capability.

Description will now be directed to the yoke type MR composite thin film heads according to other embodiments of the present invention.

Figure 7:
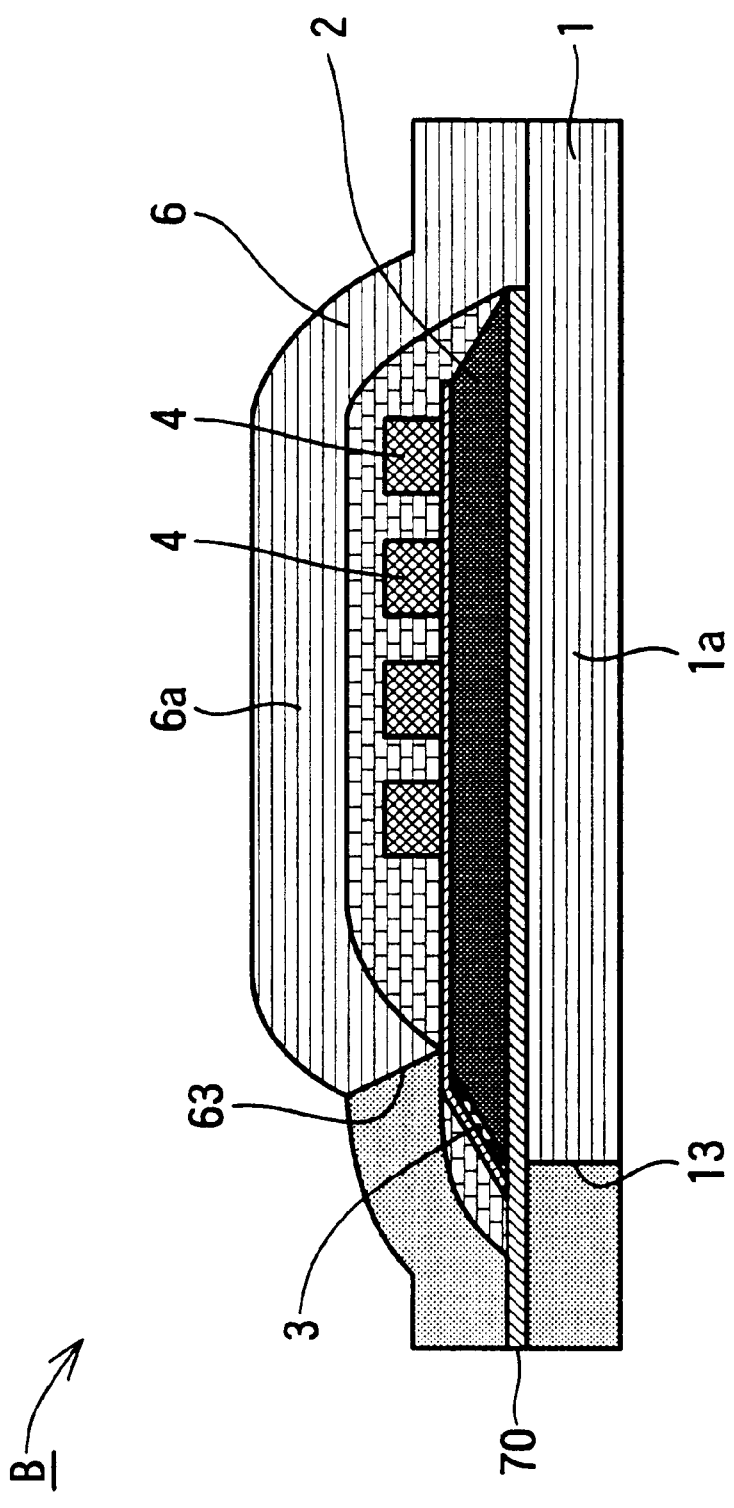
FIG. 7 is a cross sectional view of a yoke type magnetoresistive composite thin film head according to a second embodiment of the present invention.

FIG. 7 is a cross sectional view of a yoke type MR composite thin film head according to a second embodiment of the present invention. In the yoke type MR composite thin film head B shown in FIG. 7, the lower pole 1 has a rear portion as a lower pole low-permeability portion 1a made from a material having a low permeability $\mu p$ and the upper pole 6 has a rear portion as the upper pole low-permeability portion 6a made from a material having a low permeability $\mu p$. More specifically, in the lower pole 1, the rear portion after the MR joining position 13 under the MR pattern 3 is made from a magnetic material having a permeability $\mu p$ reduced to about ½. In the upper pole 6, the rear portion after the MR joining position 63 at the upper end of the MR pattern 3 is made from a magnetic material having a permeability $\mu p$ reduced to about ½. The permeability reduction is realized by slightly modifying the composition of the NiFe alloy.

By reducing the permeability $\mu p$ to ½, the total reluctance Rp of the upper and lower poles in series is doubled, whereas the signal magnetic flux flowing to the MR pattern is increased by 30% or more in comparison to the first embodiment. That is, second embodiment enables to increase the reproduction output by 30% or more.

Figure 8:
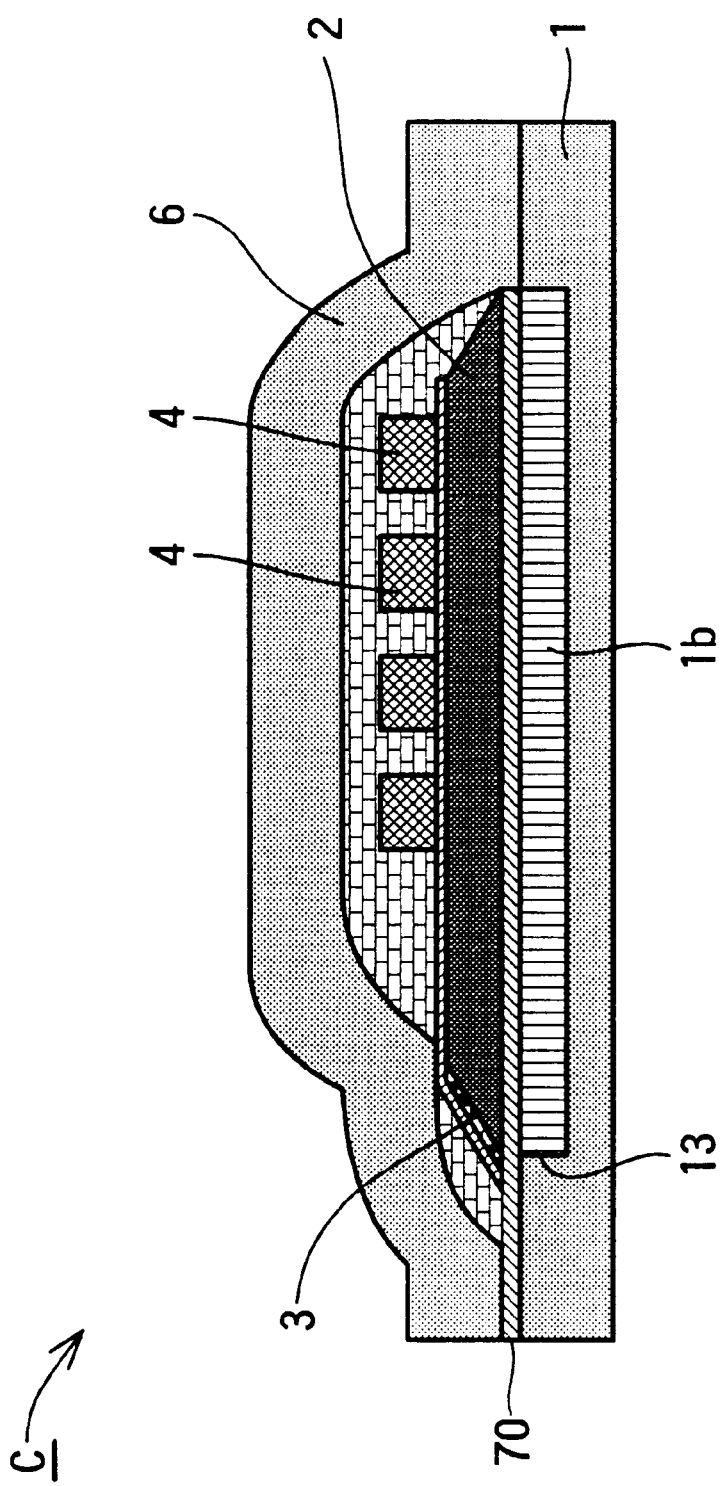
FIG. 8 is a cross sectional view of a yoke type magnetoresistive composite thin film head according to a third embodiment of the present invention.

FIG. 8 is a cross sectional view of a yoke type MR composite thin film head according to a third embodiment of the present invention. In the yoke type MR composite thin film head C shown in FIG. 8, the lower pole 1 has a burying portion 1b, resulting in reduction of thickness of the lower pole. The rear portion after the MR joining position 13 reduces thickness to ½.

As a result, the upper pole 6 and the lower pole 1 in series have reluctance increased to 1.5 times. As a result, the magnetic flux amount flowing into the MR pattern increases by 20% in comparison to the first embodiment. The burying portion 1b is filled with alumina and subjected to flattening by the step shown in FIG. 5A.

If the lower pole decreases its film thickness to ½, the saturation magnetic flux amount Φp is decreased to ½ if the other conditions remain same. However, in the present embodiment, the lower pole is made from not the conventional NiFe alloy but CoNiFe alloy material having the doubled saturation magnetic flux density Bsp. Accordingly, the saturation magnetic flux is not changed, without lowering the recording capability. Thus, sufficient recording capability is retained.

Figure 9:
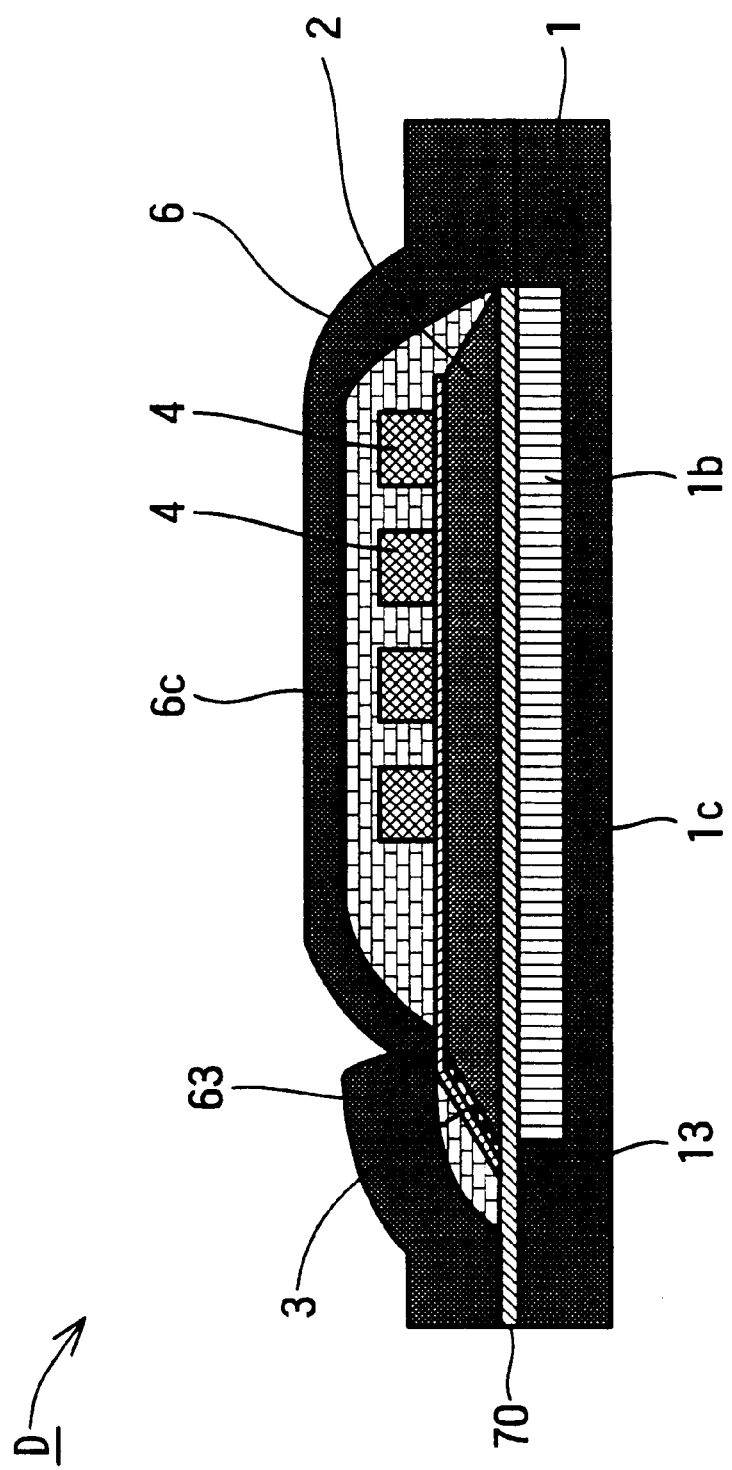
FIG. 9 is a cross sectional view of a yoke type magnetoresistive composite thin film head according to a fourth embodiment of the present invention.

FIG. 9 is a cross sectional view of a yoke type MR composite thin film head according to a fourth embodiment of the present invention. In the yoke type MR composite thin film head D shown in FIG. 9, the lower pole 1 includes a lower pole thin film portion 1c, and the upper pole 6 includes an upper pole thin film portion 1c. The rear portion of the lower pole 1 after the lower pole MR joining position 13 has a film thickness reduced to ½ compared to an ordinary film thickness, and the rear portion of the upper pole 1 after the upper pole MR joining position 63 has a film thickness reduced to ½ compared to an ordinary film thickness. Moreover, the upper and the lower poles are formed by a CoNiFe plating material having a saturation magnetic flux density twice more than the conventional one.

The upper and the lower pole have a series reluctance which is ½ of the first embodiment. Accordingly, the signal flux flowing into the MR patter 3 increases by 30% or more, and the reproduction output of the MR pattern 3 increases by 30% or more. Though the film thickness is reduced to ½, the saturation magnetic flux density is doubled. Accordingly, the saturation magnetic flux amount is same as in the conventional one, and the head D has a recording capability equivalent to the conventional one.

Furthermore, the permeability of the upper and the lower poles can be reduced to ½ by slightly modifying the material composition. In this case the series reluctance is four times more than in the first embodiment, and the signal magnetic flux flowing to the MR patter 3 is increased by 60%. That is, the MR pattern has a reproduction output increased by 60%.

Figure 10:
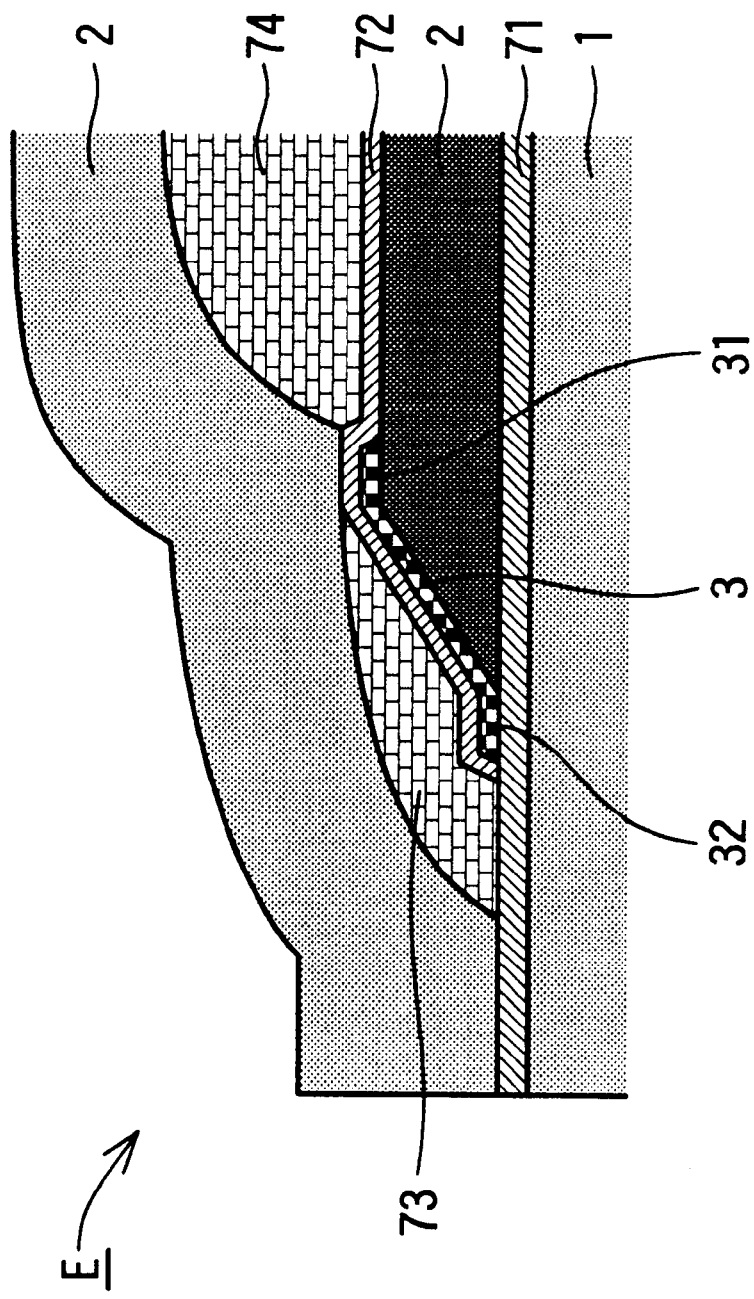
FIG. 10 is a cross sectional view of an essential portion of a yoke type magnetoresistive composite thin film head according to a fifth embodiment of the present invention.

FIG. 10 is a cross sectional view of an essential portion of a yoke type MR composite thin film head according to a fifth embodiment of the present invention. In the yoke type MR composite thin film head E shown in FIG. 10, the MR pattern 3 extends to the top of the mesa pattern 2 constituting an MR mesa upper junction 31 and the MR pattern 3 extends to the bottom of the mesa patter 2 (top of the gap insulation layer 71) to constitute an MR mesa lower junction 32. The top of the MR pattern 3 is magnetically connected to the upper pole 6 via the MR mesa upper junction 31. Also, the bottom of the MR patter 3 is magnetically connected to the lower pole 1 via the MR mesa lower junction 32. Since the junctions 31 and 32 are provided, it is possible to increase the area magnetically connected than in the case ends of the MR pattern 3 are magnetically connected. This increase in the magnetically connected area reduces the reluctance between the MR pattern 3 and the upper and the lower poles 6 and 1, thus increasing the signal magnetic flux amount flowing through the MR pattern. Thus, with the aforementioned configuration, it is possible to increase the signal detection sensitivity of the yoke type MR head.

Figure 11:
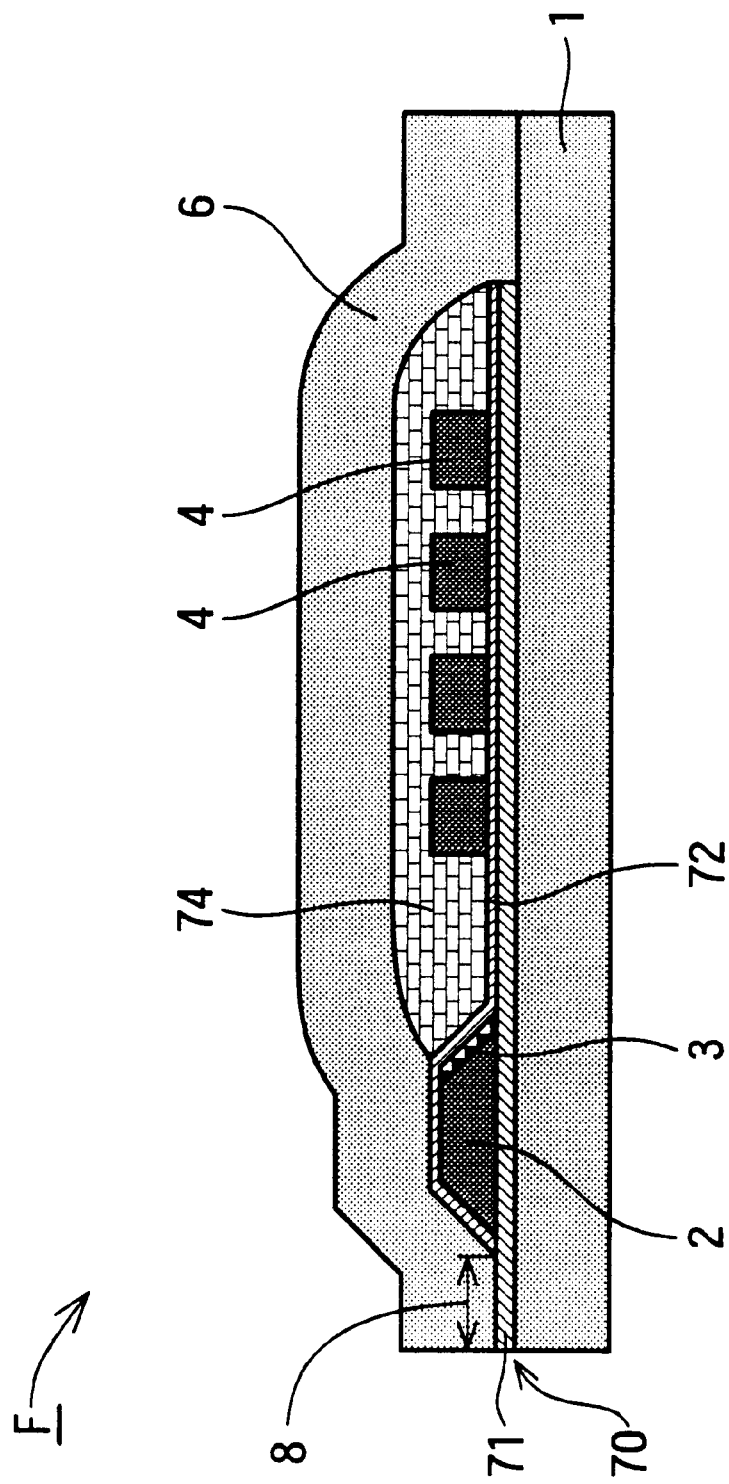
FIG. 11 is a cross sectional view of an essential portion of a yoke type magnetoresistive composite thin film head according to a sixth embodiment of the present invention.
Figure 12:
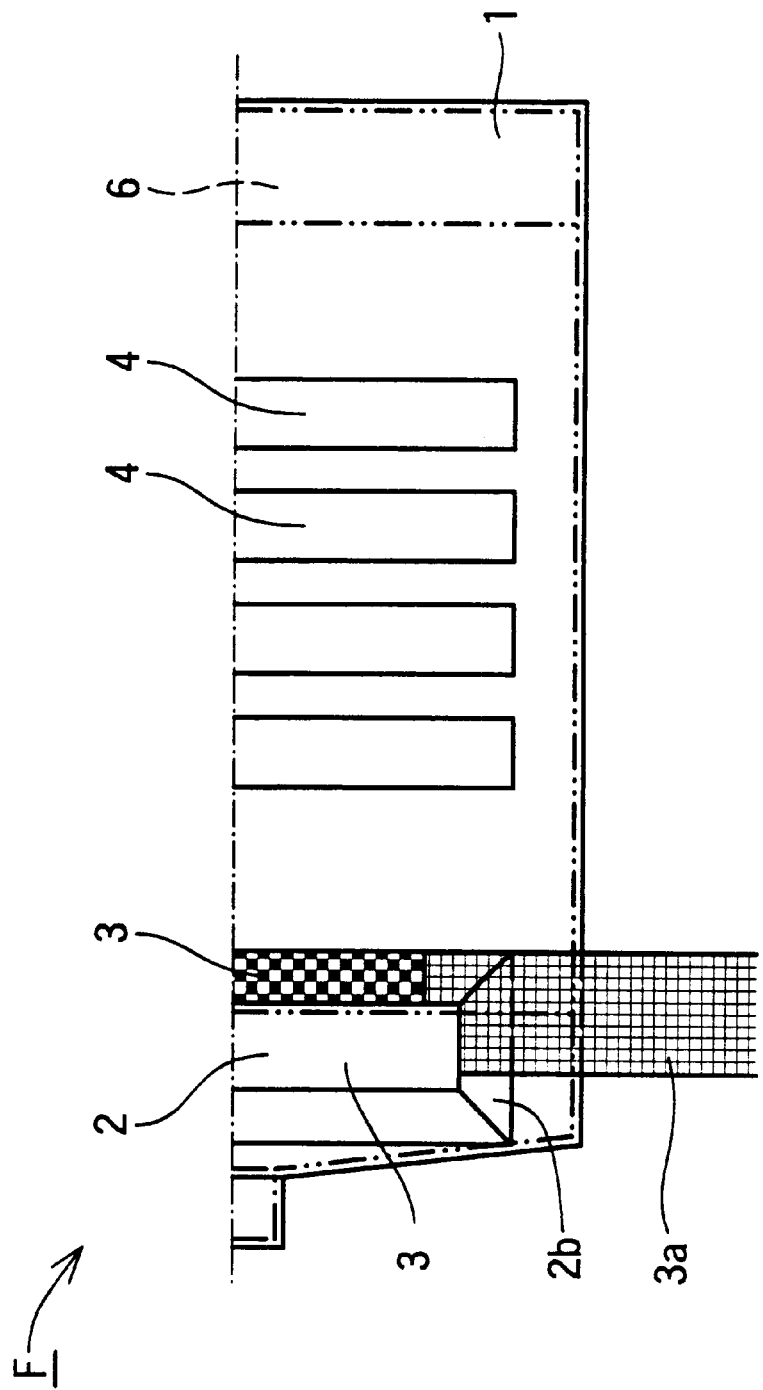
FIG. 12 is a plan view of the yoke type magnetoresistive composite thin film head according to the sixth embodiment of the present invention.

FIG. 11 is a cross sectional view of a yoke type MR composite thin film head according to a sixth embodiment of the present invention. FIG. 12 is plan view of the sixth embodiment.

As shown in FIG. 11, in the yoke type MR composite thin film head F, the mesa pattern 2 is provided near the recording gap 70. This mesa pattern 2 defines the throat height 8 of the recording gap. The MR pattern 3 is formed behind the mesa pattern 2, i.e., on the slope farther from the recording gap. The coil pattern 4 is provided not on the mesa pattern 2 but on the MR insulation layer 72 formed on the gap insulation layer 71. The coil pattern is covered by the second stepped portion coverage layer 74, and finally, the upper pole 6 is formed by plating.

In this yoke type MR composite thin film head F, the coil pattern 4 and the mesa pattern 2 are arranged almost on the same flat plane. This enables to reduce the height of the second stepped portion coverage layer, which in turn enables to reduce thickness of the plating frame forming resist. This is advantageous the pole tip width of the pole 6 which defines the recording track width.

As shown in the plan view of FIG. 12, the MR pattern 3 formed on the rear slope of the mesa pattern 2 is connected to an electrode (not depicted) via the MR lead pattern 3a extending from the slope where the MR pattern 3 is provided, to the slope 2b so as to be connected to an electrode (not depicted).

It should be noted that in the plan view of FIG. 12, the yoke type MR composite thin film head has a symmetric plan view as in FIG. 3, only the lower half is shown. Moreover, in FIG. 12, in order to show the interior configuration, the upper pole 6 is removed. The configuration of the upper pole 6 is indicated by a virtual line (alternate long and two short dashes line) The virtual line is slightly shifted from the actual position. Moreover, the gap insulation layer 71, and the step coverage layers 73 and 74 are omitted. Furthermore, the MR pattern 3 and the MR lead pattern 3a are hatched so as to clarify their regions and not their cross sectional view.

Figure 13:
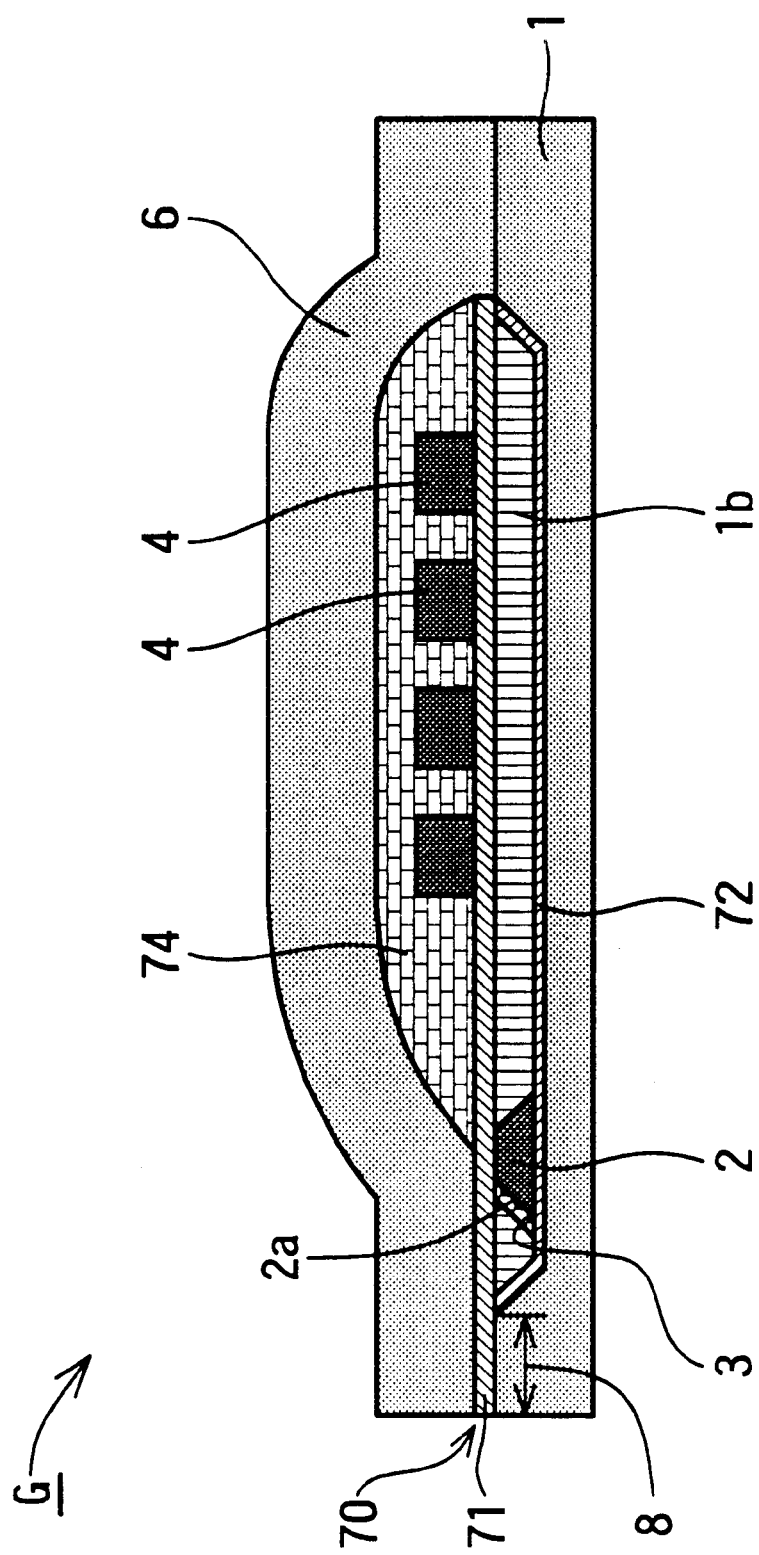
FIG. 13 is a cross sectional view of a yoke type magnetoresistive composite thin film head according to a seventh embodiment of the present invention.

FIG. 13 is a cross sectional view of a yoke type MR composite thin film head according to a seventh embodiment of the present invention. In the yoke type MR composite thin film head G shown in FIG. 13, the mesa pattern 2 is formed in the lower pole 2 and on the slope 2a of the recording gap side, there is formed the MR pattern 3. The throat height 8 of this recording head G is defined by the counter bore of the mesa pattern 2 in the lower pole. Accordingly, the MR pattern 3 can be arranged in the vicinity of the throat height 8, increasing the flow of the signal magnetic flux to the MR pattern. Furthermore, it is possible to reduce the height of the second step coverage layer 74, so as to facilitate to form a narrow track pattern as the recording pole. In the lower pole 1, an MR insulation layer 72 is formed, on which the mesa pattern 2 is formed. This MR insulation 72 electrically separate the bottom of the MR pattern 3 from the lower pole 1. After the MR pattern 3 is formed on the slope of the mesa pattern 2, an indentation of the lower pole is filled with a non-magnetic material and flattened. After this, the gap insulation layer 71 is formed. It is also possible that a first indentation preceding the MR pattern is filled with a non-magnetic material and a second indentation following the MR pattern is filled with a magnetic material.

Figure 14:
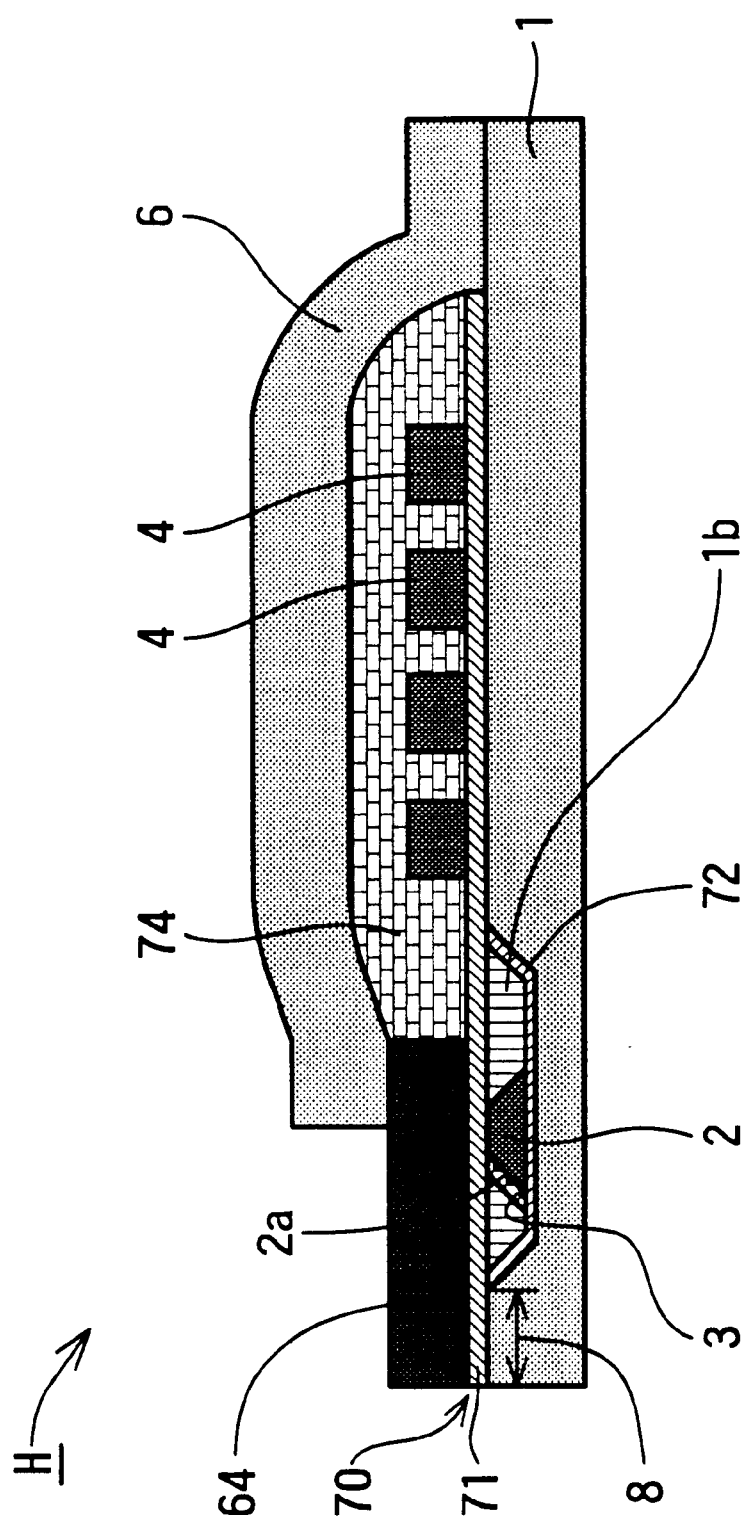
FIG. 14 is a cross sectional view of an essential portion of a yoke type magnetoresistive composite thin film head according to an eighth embodiment of the present invention.

FIG. 14 is a cross sectional view of a yoke type MR composite thin film head according to an eighth embodiment of the present invention. In the yoke type MR composite thin film head H shown in FIG. 14, like the seventh embodiment shown in FIG. 13, the lower pole has an indentation in which the mesa pattern 2 is formed where the MR pattern 3 is to be formed. Furthermore, after the mesa pattern 2 and the MR pattern 3 are formed, the indentation is filled with alumina and made flat by lapping. The flattened lower pole 1 is covered with an upper pole front portion 64 formed to directly define a recording track width. In this formation, a plating frame is formed on the flat plane by the exposure and development of photo resist. Accordingly, it is possible to select an almost ideal exposure condition. Consequently, it becomes easier to form a plating frame of a narrow track width. After the upper pole front portion 64 is formed, a coil pattern 4 is formed, and then the second step coverage layer 74 is formed. Lastly, the upper pole main portion not requiring an accurate pattern dimensions is formed by frame plating method.

Figure 15:
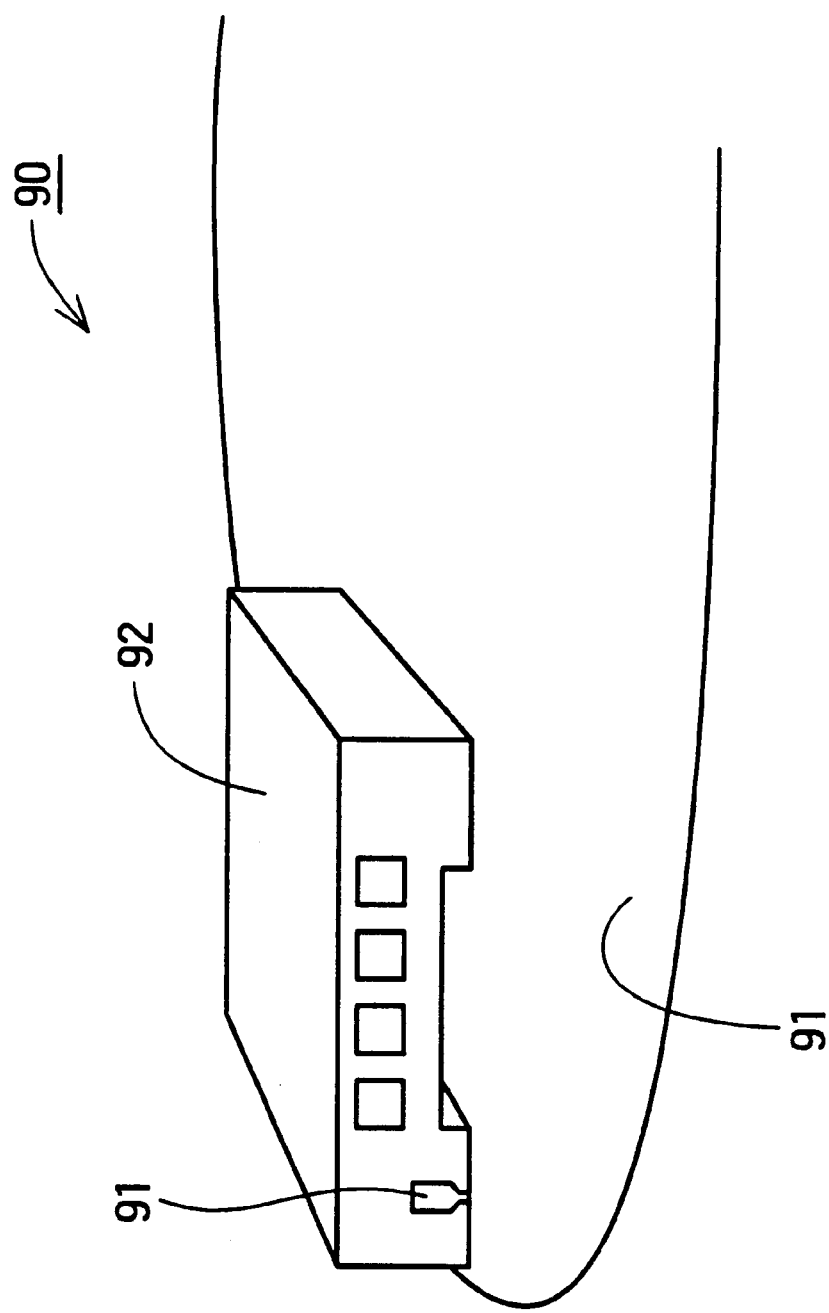
FIG. 15 shows an essential configuration of a magnetic disk apparatus using the yoke type magnetoresistive composite thin film head according to the present invention.

FIG. 15 shows an essential portion of a magnetic disk apparatus using the yoke type MR composite thin film head according to the present invention. The magnetic disk apparatus 90 includes the composite magnetic head 91 shown in FIG. 1 and others mounted on a slider substrate 92. This slider substrate 92 is maintained above a magnetic disk medium 93 and the magnetic recording medium 93 is rotated for magnetic recording or reproduction. The composite magnetic head 91 has the MR pattern 3 not exposed on the air bearing surface. Accordingly, even if the composite magnetic head 91 is brought into contact with the magnetic disk medium 93, no thermal asperity noise is generated. Thus, it is possible to realize the magnetic disk apparatus 90 having a high reliability.

Figure 16:
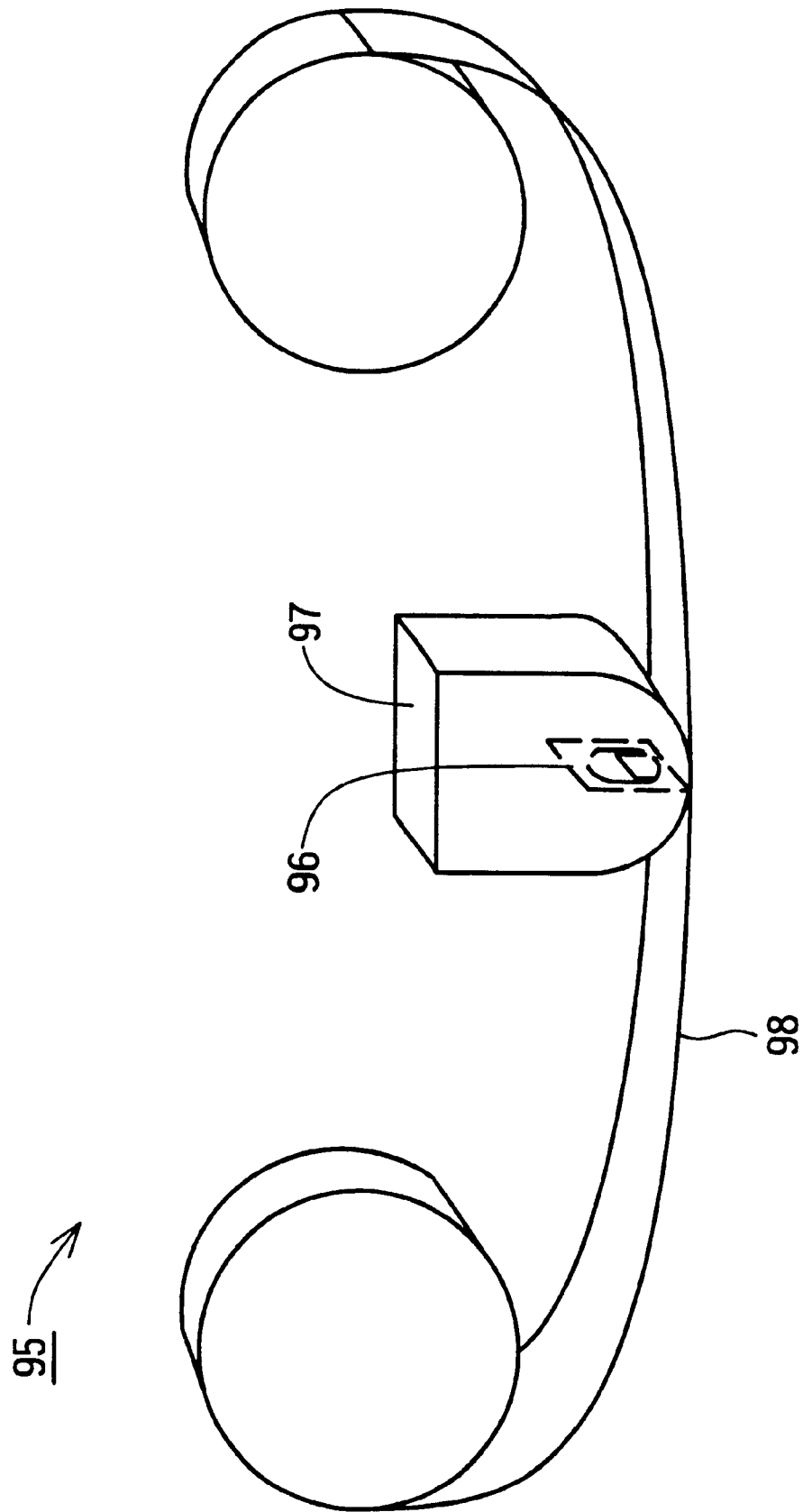
FIG. 16 shows an essential configuration of a magnetic tape apparatus using the yoke type magnetoresistive composite thin film head according to the present invention.
Figure 17:
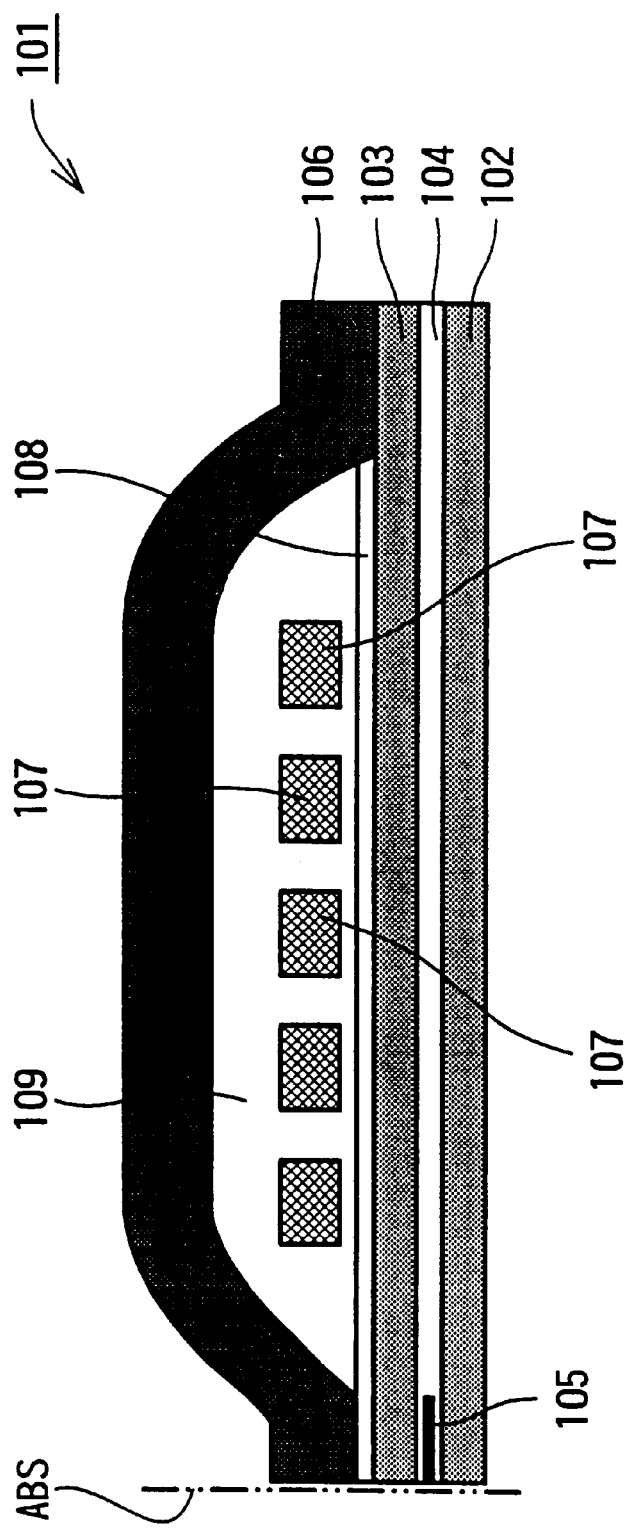
FIG. 17 is a cross sectional view of conventional shield type MR head configuration.

FIG. 16 shows an essential portion of a magnetic tape apparatus using the yoke type MR composite thin film head according to the present invention. The magnetic tape apparatus 95 includes the composite magnetic head 96 shown in FIG. 1 and others mounted on a head assembly 97. This head assembly 97 is brought into contact with a magnetic tape 98 and a magnetic tape 98 is made to travel for magnetic recording or reproduction. The composite magnetic head 96 is constantly in contact with the magnetic tape while travelling. However, the head is yoke type and no thermal asperity noise is caused, enabling to obtain a preferable reproduction signal waveform.

While magnetic disk apparatus and the magnetic tape apparatus have been explained as a magnetic recording apparatus, it is also possible to apply the present invention to a magnetic storage apparatus using a rotary head.

As has been described above, in the yoke type MR head according to the present invention, the upper pole and the lower pole is bridged via the magnetoresistive (MR) pattern so as to form a magnetic flux flow path via the MR pattern, enabling to reproduce a magnetic recording information through this path. Both of the upper and the lower poles have a configuration without a gap, when the yoke type MR head is used for recording, it is possible to increase the magnetic flux amount for recording, thus increasing the recording capability.

Moreover, in the yoke type magnetoresistive (MR) composite thin film head according to the present invention, the upper pole and the lower pole are magnetically bridged by a MR sensing element arranged on a mesa pattern, thus forming a separate magnetic flux flow path via the MR element. This separate magnetic flux flow path enables to reproduce a magnetic recording information. Since both of the upper pole and the lower pole have no gap, it is possible to increase the magnetic flux amount for recording, thus improving the recording capability.

The magnetoresistive sensing element arranged on one of the slopes of the mesa pattern is in contact with a lead pattern extending on another slope roughly forming a right angle with the aforementioned slope. This assures the lead pattern to be connected to an electrode.

When the coil pattern is formed on the mesa pattern, it is possible to reduce the dimension of the yoke type MR composite thin film head in the front-rear direction.

When the coil pattern is formed adjacent to the mesa pattern, it is possible to reduce the dimension of the yoke MR composite thin film head in the height direction. Furthermore, by arranging the coil pattern 4 and the mesa pattern on almost the same plane, it is possible to reduce the step, which enables to reduce the thickness of the upper pole plating frame photo resist. This is advantageous to reduce the pole tip end which defines the recording track width.

Moreover, the upper pole or the lower pole may have a reduced thickness. This increases the upper and lower pole series reluctance, which in turn increase the magnetic flux amount flowing in the magnetoresistive element (MR pattern).

The upper pole or the lower pole may have a reduced magnetic permeability so as to increase the series reluctance of the upper and the lower pole. This increases the magnetic flux amount flowing into the MR element (MR pattern).

The upper pole or the lower pole may have a reduced magnetic permeability and an increased saturation magnetic flux density. This increases the reproduction output as well as assures the recording capability.

The lower pole may have an indentation to define the throat height and a mesa pattern is arranged in the indentation. This enables to arrange the magnetoresistive element (MR pattern) in the vicinity of the throat height, increasing the ratio of the signal magnetic flux flow into the magnetoresistive element (MR pattern). This also reduces the dimension of the yoke type MR composite thin film head in its height direction, which facilitates to narrow the track.

The upper pole may have a separate front portion. This facilitates plating frame formation of a narrow track width. The magnetic storage apparatus employs the yoke type MR composite thin film head according to the present invention and no thermal asperity is generated. Accordingly, it is possible to realize a magnetic storage apparatus having a high reliability.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-336657 (Filed on Nov. 27, 1998) including specification, claims, drawings and summary are incorporated herein by reference in its entirety.

What is claimed is:

1. A yoke type magnetoresistive (MR) head comprising:
   an upper pole having a rear end;
   a lower pole having a rear end that is magnetically connected to the rear end of the upper pole to form a circuit path for magnetic flux;
   a magnetic gap, having a throat height, formed between a front end of the upper pole and a front end of the lower pole;
   a magnetoresistive element indented from the magnetic gap a distance that is at least equal to the throat height of the magnetic gap, so that the upper pole and the lower pole are magnetically bridged via the magnetoresistive element so as to form a separate magnetic flux path;
   a mesa shaped structure disposed between the upper pole and the lower pole, the mesa shaped structure supports the magnetoresistive element on a sloped surface thereof; and
   a write-in coil supported by the mesa shaped structure.

2. A yoke type magnetoresistive (MR) composite thin film head comprising:
- a lower pole;
- an upper pole, which is connected to the lower pole to form a circuit path for magnetic flux;
- a recording gap formed between the upper pole and the lower pole, the recording gap having a throat height;
- a mesa shaped structure comprising insulation material positioned between the lower pole and the upper pole, the mesa shaped structure having at least one slope positioned within the composite thin film head at a distance greater than the throat height of the recording gap;
- a magnetoresistive sensing element supported mainly by said one slope; and
- a coil pattern positioned upon a portion of said mesa shaped structure.

3. A yoke type MR composite thin film head as claimed in claim 2, wherein the magnetoresistive sensing element arranged on one of the slopes of the mesa shaped structure is in contact with a lead pattern extending on another slope roughly forming a right angle with the slope and connected to an electrode through the slope.

4. A yoke type MR composite thin film head as claimed in claim 2, wherein the coil pattern is formed on the mesa shaped structure.

5. A yoke type MR composite thin film head as claimed in claim 2, wherein the coil pattern is formed adjacent to the mesa shaped structure.

6. A yoke type MR composite thin film head as claimed in claim 2, wherein at least in one of the upper pole and the lower pole, a portion of the film farther from the magnetic gap than the slope of the mesa shaped structure having the MR sensing element has a reduced thickness than the other portion.

7. A yoke type MR composite thin film head as claimed in claim 2, wherein at least in one of the upper pole and the lower pole, a portion of the film father from the magnetic gap than the slope of the mesa shaped structure having the MR sensing element has a reduced magnetic permeability than the other portion.

8. A yoke type MR composite thin film head as claimed in claim 2, wherein at least in one of the upper pole and the lower pole, a portion of the film farther from the magnetic gap than the slope of the mesa shaped structure having the MR sensing element has a reduced magnetic permeability and an increased saturation magnetic flux density than the other portion.

9. A yoke type MR composite thin film head as claimed in claim 2, wherein the lower pole has an indentation to define the throat height and the mesa shaped structure is arranged in the indentation.

10. A yoke type MR composite thin film head as claimed in claim 2, wherein the lower pole has an indentation to define the throat height and the mesa shaped structure is arranged in the indentation, after which the MR sensing element is arranged on a slope of the mesa shaped structure; the indentation is filled with a non-magnetic insulator and flattened; a gap insulation layer is formed; a front portion of the upper pole is formed; and then the coil pattern and the upper pole are formed.

11. The yoke type magnetoresistive (MR) composite thin film head of claim 2, further comprising a recording gap insulation layer positioned between the upper pole and lower pole.

12. A yoke type magnetoresistive (MR) head comprising:
- an upper pole having a rear end;
- a lower pole having a rear end that is magnetically connected to the rear end of the upper pole to form a circuit path for magnetic flux;
- a magnetic gap, having a throat height, formed between a front end of the upper pole and a front end of the lower pole;
- a magnetoresistive element indented from the magnetic gap a distance that is at least equal to the throat height of the magnetic gap, so that the upper pole and the lower pole are magnetically bridged via the magnetoresistive element so as to form a separate magnetic flux path;
- a support surface having a mesa shape with at least one slope disposed between the upper pole and the lower pole; and
- wherein said magnetoresistive element is supported mainly by said one slope so as to form a new shunt magnetic circuit between the lower pole and upper pole.

13. The yoke type magnetoresistive (MR) composite thin film head of claim 12, further comprising an insulating material positioned between the magnetoresistive element and a write-in coil.

14. A yoke type magnetoresistive (MR) composite thin film head comprising:
- a lower pole;
- an upper pole, which is connected to the lower pole to form a circuit path for magnetic flux;
- a recording gap formed between the upper pole and the lower pole, the recording gap having a throat height;
- a mesa-shaped structure comprising insulation material positioned between the lower pole and the upper pole, the mesa-shaped structure having at least one slope positioned within the composite thin film head at a distance greater than the throat height of the recording gap;
- a magnetoresistive sensing element supported mainly by an outside portion of said one slope; and
- a coil pattern positioned upon a portion of said mesa-shaped structure.

15. The yoke type magnetoresistive (MR) composite thin film head of claim 14, further comprising an insulating material positioned between the magnetoresistive element and the coil pattern.

16. A yoke type magnetoresistive (MR) composite thin film head comprising:
- a lower pole;
- an upper pole, which is connected to the lower pole to form a circuit path for magnetic flux;
- a recording gap formed between the upper pole and the lower pole, the recording gap having a throat height;
- a mesa-shaped structure comprising insulation material positioned between the lower pole and the upper pole, the mesa-shaped structure having at least one slope positioned within the composite thin film head at a distance greater than the throat height of the recording gap;
- a magnetoresistive sensing element supported mainly by said one slope; and
- a coil pattern positioned upon a portion of said mesa-shaped structure, wherein the magnetoresistive sensing element forms a separate flux path between the lower pole and the upper pole.

17. The yoke type magnetoresistive (MR) composite thin film head of claim 16, further comprising a recording gap insulation layer positioned between the upper pole and lower pole.

* * * * *